United States Patent
Asai

(10) Patent No.: US 9,579,652 B2
(45) Date of Patent: Feb. 28, 2017

(54) DRIVING DEVICE OF MICROPUMP AND MICROVALVE, AND MICROFLUIDIC DEVICE USING SAME

(71) Applicant: Panasonic Intellectual Property Management Co., Ltd., Osaka (JP)

(72) Inventor: Katsuhiko Asai, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/633,532

(22) Filed: Feb. 27, 2015

(65) Prior Publication Data

US 2015/0251179 A1    Sep. 10, 2015

(30) Foreign Application Priority Data

Mar. 10, 2014    (JP) .................. 2014-046516

(51) Int. Cl.
  *B01L 3/00*    (2006.01)
  *F04B 49/06*    (2006.01)
  (Continued)

(52) U.S. Cl.
  CPC ..... *B01L 3/50273* (2013.01); *B01L 3/502738* (2013.01); *F03G 7/065* (2013.01); *F04B 19/006* (2013.01); *F16K 99/0015* (2013.01); *F16K 99/0038* (2013.01); *F16K 99/0044* (2013.01); *B01L 2300/0864* (2013.01); (Continued)

(58) Field of Classification Search
  CPC ..... B01L 2300/0816; B01L 2300/0809; B01L 2300/08; B01L 2300/00; B01L 3/50273; B01L 3/5027; B01L 3/502; B01L 3/50; F04B 49/06; F03G 7/06; F03G 7/065

USPC ............. 422/502, 501, 500, 50, 505, 504; 417/44.1
See application file for complete search history.

(56) References Cited

U.S. PATENT DOCUMENTS

2011/0045577 A1* 2/2011 Bruzewicz ............. H05K 3/101
                                                                  435/287.1
2013/0078625 A1* 3/2013 Holmes ............. G01N 35/0092
                                                                  435/6.11

FOREIGN PATENT DOCUMENTS

JP    1-266376    10/1989
JP    11-257233    9/1999

OTHER PUBLICATIONS

Masaki et al , JP 11-257233 English Machine Translation of Description, obtained from J-Plat Plat on May 20, 2016, pp. 1-3.*

* cited by examiner

*Primary Examiner* — Christine T Mui
(74) *Attorney, Agent, or Firm* — McDermott Will & Emery LLP

(57) ABSTRACT

A driving device of a micropump and a microvalve is provided. The driving device comprises a pump driver controlled by a pump controller, a valve driver controlled by a valve controller, a power supply part, a switch part. The pump driver having a first shape memory alloy wire, a micropump of the first shape memory alloy wire, a wiring part arranged in parallel to the first shape memory alloy wire, and a first selector switch that switches between a state where only the first shape memory alloy wire is energizable and a state where the wiring part is energizable. The valve driver having a plurality of second shape memory alloy wires, a plurality of microvalves of second shape memory alloy wires, and a second selector switch that brings into a state where one of the plurality of second shape memory alloy wires is energizable.

12 Claims, 18 Drawing Sheets

(51) Int. Cl.
  *F03G 7/06* (2006.01)
  *F04B 19/00* (2006.01)
  *F16K 99/00* (2006.01)
(52) U.S. Cl.
  CPC . *B01L 2300/0887* (2013.01); *B01L 2300/123* (2013.01); *B01L 2300/1827* (2013.01); *B01L 2400/0481* (2013.01); *B01L 2400/0655* (2013.01); *B01L 2400/0661* (2013.01); *F16K 2099/0084* (2013.01); *F16K 2099/0094* (2013.01)

DRIVING DEVICE OF MICROPUMP AND MICROVALVE, AND MICROFLUIDIC DEVICE USING SAME

BACKGROUND

1. Technical Field

The present disclosure relates to a driving device of a micropump and a microvalve capable of easily realizing control of pump displacement and reducing loss by energizing a shape memory alloy for pump driving only during energizing a shape memory alloy for valve driving arranged in series, in a microfluidic device that drives a pump or a valve, using the shape memory alloy, and a microfluidic device using the driving device.

2. Description of the Related Art

There has been known a microfluidic device as a device that creates a minute flow channel, a reactor vessel, or the like, using fine processing technologies such as a micromachining technology, and that conducts chemical analysis, chemical synthesis, bio experiment or the like. The microfluidic device is also called a μ-TAS or a Labo on a chip, and has been developed. Ordinarily, in the microfluidic device, a supplied liquid such as blood is sent to a reactor provided on the device to perform thermal or chemical reaction processing. Thereafter, the liquid after reaction processing is sent to a detector provided on the device, and a result of the reaction is determined to thereby evaluate the supplied liquid. Therefore, in the microfluidic device, the micropump or the microvalve to control a flow of the liquid is required. As one method of the micropump or the microvalve, there has been a method of deforming a diaphragm provided in the microfluidic device. The diaphragm, when being deformed to push a flow channel, comes to serve as the valve. Moreover, by using a check valve and volume change accompanying reciprocation displacement of the diaphragm, a so-called diaphragm type pump can be configured. For a method for deforming the diaphragm, there have been proposed methods using various actuators such as a piezoelectric actuator, a static actuator, and an electromagnetic actuator, because the actuator to be driven can be freely selected. As one type of the above-described micropump or microvalve, there has been proposed a diaphragm type micropump or microvalve using a shape memory alloy actuator (e.g., refer to PTL 1 and PTL 2). The shape memory alloy actuator uses a phenomenon in which a wire-like shape memory alloy contracts by temperature rise due to energization heating, and extends to an original length by temperature drop due to natural heat dissipation. Using the shape memory alloy actuator enables a micropump or microvalve compact in sizes in directions other than a displacement direction to be configured, which allows the plurality of micropumps or microvalves to be easily arranged on the microfluidic device.

SUMMARY

According to a first aspect of the present disclosure, there is provided a driving device of a micropump and a microvalve including:

a pump driver having a first shape memory alloy wire, a micropump that performs pump operation with extension and contraction of the first shape memory alloy wire, a short-circuit wiring part arranged in parallel to the first shape memory alloy wire, and a first selector switch that switches between a state where only the first shape memory alloy wire is energizable and a state where the short-circuit wiring part is energizable;

a valve driver having a plurality of second shape memory alloy wires, a plurality of microvalves that perform valve operation with extension and contraction of the respective plurality of second shape memory alloy wires, and a second selector switch that brings into a state where one of the plurality of second shape memory alloy wires is energizable;

a power supply part;

a switch part that is connected to the pump driver and the valve driver in series, and turns on and off a current flowing through the pump driver and the valve driver from the power supply part;

a valve controller that controls a state of the second selector switch and frequency of on and off of the switch part; and a pump controller that controls a period when the first selector switch enters the state where only the first shape memory alloy wire is energizable, when the switch part is in an on state.

General and specific aspects of the foregoing may be realized by systems and methods, and arbitrary combination of the systems and the methods.

According to the above-described aspect of the present disclosure, only when the shape memory alloy wires for microvalve driving are energized, the shape memory alloy wire for micropump driving is energized. Thus, in contrast to the microvalves of on and off operation, during the driving of the micropump requiring volume control, the shape memory alloy wire for micropump operation is driven at the voltage of the power supply part divided by resistances of the shape memory alloy wires for microvalve operation. As a result, the control of the pump volume becomes easy. Moreover, since the voltage division is realized by the resistance of the shape memory alloy wire corresponding to the driven microvalve, wasteful loss is not caused. Thus, the driving device of the micropump and the microvalve capable of easily realizing the control of the pump volume and reducing loss can be attained.

DETAILED DESCRIPTION OF THE EMBODIMENTS

Figure 1:
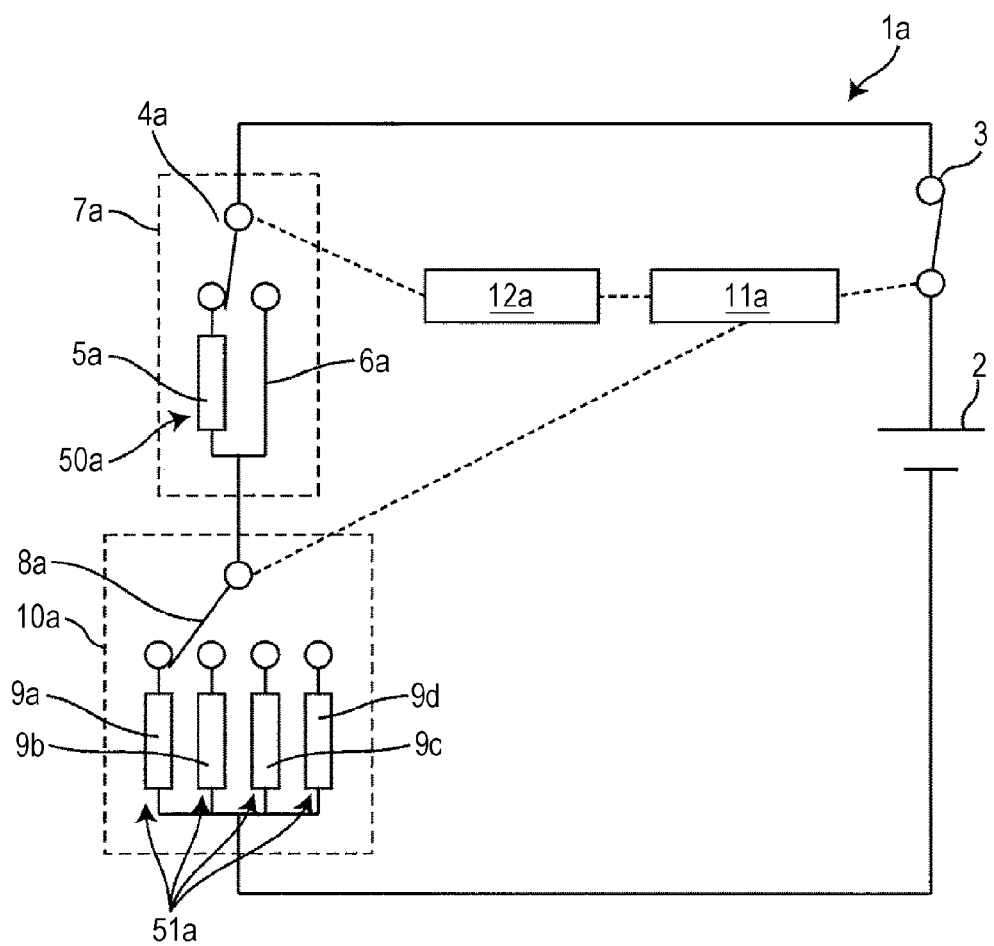
FIG. 1 is a diagram showing an outline of a fluid conveyance device in a first embodiment of the present disclosure.

The actuator using the wire-like shape memory alloy can generate a deformation of about 4%. Accordingly, in the micropump or the microvalve, as a length of the shape memory alloy required for displacing the diaphragm by about 0.1 mm, 10 mm suffices even if a margin is given in view of a life or the like. A resistance of the shape memory alloy is about 61 Ω/m in the case of a wire having a diameter of 150 μm, and thus, the resistance is about 0.61Ω in the case of the wire having the length of 10 mm. Moreover, a standard current in subjecting the shape memory alloy wire to energization heating is about 340 mA, and if a current exceeding this continues to be applied, a temperature of the shape memory alloy rises too much, which leads to deterioration in performance. From the resistance value and the standard current, a standard voltage in subjecting the shape memory alloy wire having the length of 10 mm to energization heating is only about 0.21 V, so that an applied electric power is 71 mW.

On the other hand, for adjustment of the applied electric power to the shape memory alloy actuator, PWM (Pulse Width Modulation) control is ordinarily used. The PWM control allows the shape memory alloy actuator to be intermittently energized. That is, adjusting energization time enables the applied electric power to the shape memory alloy actuator to be controlled while keeping a power supply voltage constant. Thus, a displacement amount of the shape memory alloy actuator linked with the temperature of the shape memory alloy can be controlled. However, in the case where the energization heating of the shape memory alloy wire having the length of 10 mm is subjected to PWM control by using the power supply of 1 V, in order to obtain the applied electric power equivalent to the continuous energization of 0.21 V, a duty ratio is required to be 4.4%, and as large as a current of 1.6 A is caused to instantaneously flow. Thus, in order to adjust the applied electric power to the shape memory alloy actuator and control a pump volume, a PWM control system having a sufficient resolution in a duty ratio range of 0% to 4.4% inclusive needs to be constructed. Further, since the current is large, influence by an internal resistance on loss in a driving circuit cannot be neglected. Accordingly, even though the PWM control is simply performed, high precision, coping with the large current, and reduction of loss have been demanded to the circuit, which makes circuit manufacturing difficult. The foregoing poses a problem that the control of the pump volume, which varies accompanying the displacement of the shape memory alloy actuator, cannot be easily realized.

As a method for making the circuit manufacturing easy against the above-described problem, it is considered to connect a resistor in series to the shape memory alloy wire. By the resistor, the voltage applied to the shape memory alloy wire becomes a divided voltage of the power supply voltage. When the resistor of 2.2Ω is connected in series, the voltage applied to the shape memory alloy wire is reduced to 0.22 V with respect to the power supply voltage of 1 V. In this case, most of the adjustment range of the duty ratio in the PWM control becomes available, and the current can also be reduced. This makes easier not only the circuit manufacturing but control of the pump volume. However, since nearly 80% of the applied electric power is lost in the resistor, there is a problem in efficiency.

Hereinafter, referring to the drawings, embodiments according to the present disclosure will be described in detail.

Before describing the embodiments of the present disclosure, various aspects of the present disclosure will be described.

According to a first aspect of the present disclosure, there is provided a driving device of a micropump and a microvalve including:

a pump driver having a first shape memory alloy wire, a micropump that performs pump operation with extension and contraction of the first shape memory alloy wire, a short-circuit wiring part arranged in parallel to the first shape memory alloy wire, and a first selector switch that switches between a state where only the first shape memory alloy wire is energizable and a state where the short-circuit wiring part is energizable;

a valve driver having a plurality of second shape memory alloy wires, a plurality of microvalves that perform valve operation with extension and contraction of the respective plurality of second shape memory alloy wires, and a second selector switch that brings into a state where one of the plurality of second shape memory alloy wires is energizable;

a power supply part;

a switch part that is connected to the pump driver and the valve driver in series, and turns on and off a current flowing through the pump driver and the valve driver from the power supply part;

a valve controller that controls a state of the second selector switch and frequency of on and off of the switch part; and a pump controller that controls a period when the first selector switch enters the state where only the first shape memory alloy wire is energizable, when the switch part is in an on state.

According to the above-described configuration, only when the shape memory alloy wires for microvalve driving are energized, the shape memory alloy wire for micropump driving is energized. Thus, in contrast to the microvalves of on and off operation, during the driving of the micropump requiring volume control, the shape memory alloy wire for micropump operation is driven at the voltage of the power supply part divided by resistances of the shape memory alloy wires for microvalve operation. As a result, the control of the pump volume becomes easy. Moreover, since the voltage division is realized by the resistance of the shape memory alloy wire corresponding to the driven microvalve, wasteful loss is not caused. Thus, the driving device of the micropump and the microvalve capable of easily realizing the control of the pump volume and reducing loss can be attained.

According to a second aspect of the present disclosure, provided is the driving device of the micropump and the microvalve according to the first aspect, including the plurality of valve drivers, wherein the plurality of valve drivers are connected in series.

According to the above-described configuration, in a state where the plurality of microvalves are simultaneously driven, the voltage applied to the shape memory alloy wire for micropump driving can be further reduced, so that the driving device of the micropump and the microvalve capable of easily realizing the control of the pump volume can be attained.

According to a third aspect of the present disclosure, provided is the driving device of the micropump and the microvalve according to the first aspect or the second aspect, wherein the pump driver has the plurality of first shape memory alloy wires and the plurality of micropumps, and the first selector switch switches to a state where one of the plurality of first shape memory alloy wires or the short-circuit wiring part is energizable.

According to the above-described configuration, in the state where the plurality of micropumps are selectively driven as well, the driving device of the micropump and the microvalve capable of easily realizing the control of the pump volume and reducing loss can be attained.

According to a fourth aspect of the present disclosure, provided is the driving device of the micropump and the microvalve according to any one of the first to third aspects, including the plurality of pump drivers, wherein the plurality of pump drivers are connected in series.

According to the above-described configuration, in a state where the plurality of micropumps are constantly driven simultaneously, the driving device of the micropump and the microvalve capable of easily realizing the control of the pump volume and reducing loss can be attained.

According to a fifth aspect of the present disclosure, provided is the driving device of the micropump and the microvalve according to the fourth aspect, wherein each of the pump drivers has a resistor wiring part in parallel to the first shape memory alloy wire, and each of the first selector switches can also switch to a state where only the resistor wiring part is energizable.

According to the above-described configuration, even when the one of the shape memory alloy wires for micropump driving is not energized, fluctuations of the voltage applied to the other micropump or the microvalve connected in series can be suppressed. Thus, in the state where the plurality of micropumps are driven simultaneously or individually as well, the driving device of the micropump and the microvalve capable of easily realizing the control of the pump volume and reducing loss can be attained.

According to a sixth aspect of the present disclosure, provided is the driving device of the micropump and the microvalve according to any one of the first to third aspects, wherein the valve controller adjusts frequency of on and off of the switch part in accordance with a period when the pump controller brings into the state where only the first shape memory alloy wire is energizable.

According to the above-described configuration, as energization time to the shape memory alloy wire for micropump driving is shorter, an electric power applied to the shape memory alloy wires for microvalve driving can be more prevented from increasing, so that the driving device of the micropump and the microvalve having less power consumption can be attained.

According to a seventh aspect of the present disclosure, there is provided a microfluidic device including:

the driving device of the micropump and the microvalve according to any one of the first to sixth aspects;

a liquid storage;

the micropump connected to the liquid storage;

the plurality of microvalves connected to the micropump; and a discharger connected to at least one of the plurality of microvalves.

According to the above-described configuration, the microfluidic device including the driving device of the micropump and the microvalve according to any one of the first to sixth aspects can be configured, so that the microfluidic device that can exert the actions and the effects of the driving device of the micropump and the microvalve can be attained.

According to an eighth aspect of the present disclosure, there is a method for opening a micropump and a microvalve included in a driving device of the micropump and the microvalve, the method comprising:

(a) preparing the driving device of the micropump and the microvalve, the driving device comprising:

a first pump driver having a first shape memory alloy wire, a first micropump that performs pump operation with extension and contraction of the first shape memory alloy wire, a first wiring part arranged in electrically parallel to the first shape memory alloy wire, and a first selector switch that selects between a state where only the first shape memory alloy wire is electrically energizable and a state where the first wiring part is electrically energizable;

a first valve driver having a plurality of second shape memory alloy wires, a plurality of microvalves that perform valve operation with extension and contraction of the respective plurality of second shape memory alloy wires, and a second selector switch that selects one electrically energizable second shape memory alloy wire from among the plurality of the second shape memory alloy wires;

a power supply part;

a switch part that is connected to the first pump driver and the first valve driver in series, and turns on and off a current flowing through the first pump driver and the first valve driver from the power supply part;

a valve controller that controls a state of the second selector switch and frequency of on and off of the switch part; and a pump controller that controls a period when the first selector switch enters the state where only the first shape memory alloy wire is energizable, in a case where the switch part is in an on state, the method comprising:

(b) heating the first shape memory alloy wire and the selected one electrically energizable second shape memory alloy wire to open the micropump including the first shape memory alloy wire and to open the microvalve including the selected one electrically energizable second shape memory alloy wire by repeating the following steps (b1) and (b2):

(b1) applying a voltage supplied from the power supply part to the first shape memory alloy wire and the one electrically energizable second shape memory alloy wire selected through the first selector switch and the second selector switch for given time, respectively, to heat the first shape memory alloy wire and the selected one electrically energizable second shape memory alloy wire; and (b2) applying the voltage supplied from the power supply part to the wiring part and the one electrically energizable second shape memory alloy wire selected through the first selector switch and the second selector switch, respectively, to heat the selected one electrically energizable second shape memory alloy wire.

According to the above-described configuration, a fluid flows without losing the voltage wastefully.

According to a ninth aspect of the present disclosure, provided is the method according to the eighth aspect, wherein the step (b) further comprises:

(b3) turning off the switch part after the step (b2) to turn off the current flowing from the power supply part to the first pump driver and the first valve driver; and (b4) turning on the switch part after the step (b3) to turn on the current flowing from the power supply part to the first pump driver and the first valve driver, and in the step (b), the step (b1), the step (b2), the step (b3) and the step (b4) are repeated.

According to the above-described configuration, the fluid flows without losing the voltage wastefully.

According to a tenth aspect of the present disclosure, provided is the method according to the eighth aspect, wherein the driving device of the micropump and the microvalve further comprises a second valve driver having a plurality of third shape memory alloy wires, a plurality of microvalves that perform valve operation with extension and contraction of the respective plurality of third shape memory alloy wires, and a third selector switch that selects one electrically energizable third shape memory alloy wire from among the plurality of the third shape memory alloy wires, the second valve driver is connected to the first valve driver in series, in the step (b1), the voltage supplied from the power supply part is applied to the selected one electrically energizable third shape memory alloy wire for given time to heat the selected one electrically energizable third shape memory alloy wire, and in the step (b2) as well, the voltage supplied from the power supply part is applied to the selected one electrically energizable third shape memory alloy wire to heat the selected one electrically energizable third shape memory alloy wire.

According to the above-described configuration, the fluid flows without losing the voltage wastefully.

According to an eleventh aspect of the present disclosure, provided is the method according to the eighth aspect, wherein the first pump driver further comprises a third shape memory alloy wire arranged in electrically parallel to the first shape memory alloy wire, and a third micropump that performs pump operation with extension and contraction of the third shape memory alloy wire, the first selector switch switches among a state where only the first shape memory alloy wire is energizable, a state where only the third shape memory alloy wire is energizable, and a state where the first wiring part is energizable, and in the step (b1), one of the first shape memory alloy wire and the third shape memory alloy wire is selected through the first selector switch, and the one of the second shape memory alloy wires is selected through the second selector switch to heat the selected shape memory alloy wires by applying the voltage supplied from the power supply part to the selected shape memory alloy wires for given time.

According to the above-described configuration, the fluid flows without losing the voltage wastefully.

According to a twelfth aspect of the present disclosure, provided is the method according to the eighth aspect, wherein the driving device of the micropump and the microvalve further comprises a second pump driver having a third shape memory alloy wire, a third micropump that performs pump operation with extension and contraction of the third shape memory alloy wire, a second wiring part arranged in electrically parallel to the third shape memory alloy wire, and a third selector switch that switches between a state where only the third shape memory alloy wire is energizable, and a state where the second wiring part is energizable, the second pump driver is connected to the first pump driver in series, in the step (b1), the third shape memory alloy wire is selected through the third selector switch to heat the third shape memory alloy wire by applying the voltage supplied from the power supply part to the third shape memory alloy wire for given time, and in the step (b2), the second wiring part is selected through the third selector switch.

According to the above-described configuration, the fluid flows without losing the voltage wastefully.

According to a thirteenth aspect of the present disclosure, provided is the method according to the twelfth aspect, wherein the first pump driver further comprises a resistor arranged in electrically parallel to the first shape memory alloy wire, the first selector switch switches among a state where only the first shape memory alloy wire is energizable, a state where only the resistor is energizable, and a state where the first wiring part is energizable, the step (b1) further comprises the following steps (b11) and (b12):

(b11) selecting the first shape memory alloy wire, the one of the second shape memory alloy wires and the third shape memory alloy wire through the first selector switch, the second selector switch, and the third selector switch, respectively, to heat the first to third shape memory alloy wires by applying the voltage supplied from the power supply part to the selected first to third shape memory alloy wires for given time; and (b12) selecting the resistor, the one of the second shape memory alloy wires, and the third shape memory alloy wire through the first selector switch, the second selector switch, and the third selector switch, respectively, to heat the selected second and third shape memory alloy wires by applying the voltage supplied from the power supply part to the selected second and third shape memory alloy wires for given time, and in the step (b2), the first wiring part, the one of the second shape memory alloy wires, and the second wiring part are selected through the first selector switch, the second selector switch, and the third selector switch, respectively, to heat the selected second shape memory alloy wire by applying the voltage supplied from the power supply part to the selected second shape memory alloy wire for given time.

According to the above-described configuration, the fluid flows without losing the voltage wastefully.

According to a fourteenth aspect of the present disclosure, provided is the driving device of the micropump and the microvalve according to the first aspect, which is further operative to:

(a) heat the first shape memory alloy wire and the selected one electrically energizable second shape memory alloy wire to open the micropump including the first shape memory alloy wire and the microvalve including the selected one electrically energizable second shape memory alloy wire by repeating the following (b) and (c):

(b) apply a voltage from the power supply part to the first shape memory alloy wire and the one electrically energizable second shape memory alloy wire selected through the first selector switch and the second selector switch for given time, respectively, to heat the first shape memory alloy wire and the selected one electrically energizable second shape memory alloy wire; and (c) apply the voltage from the power supply part to the wiring part and the one electrically energizable second shape memory alloy wire selected through the first selector switch and the second selector switch, respectively, to heat the selected one electrically energizable second shape memory alloy wire.

According to the above-described configuration, a fluid flows without losing the voltage wastefully.

Hereinafter, the driving device of the micropump and the microvalve, and the microfluidic device using the driving device according to embodiments of the present disclosure will be described with reference to the drawings.

First Embodiment

Configuration

FIG. 1 shows an outline of fluid conveyance device 1a functioning as one example of a driving device of a micropump and a microvalve in a first embodiment of the present disclosure.

Fluid conveyance device 1a includes at least pump driver 7a, valve driver 10a, a power supply part, a switch part (on/off switch part), valve controller 11a, and pump controller 12a. In fluid conveyance device 1a, the power supply part, the switch part, pump driver 7a, and valve driver 10a are connected in series.

Fluid conveyance device 1a is driven by DC power supply 2 as one example of the power supply part. Only when switch circuit 3 as one example of the switch part connected to DC power supply 2 is on, a current flows in fluid conveyance device 1a. At this time, the current from DC power supply 2 also flows through pump driver 7a and valve driver 10a, which are connected to switch circuit 3 in series.

Pump driver 7a is made up of switching circuit 4a as one example of a first selector switch, linear shape memory alloy wire 5a as one example of a first shape memory alloy wire, and copper wire 6a as one example of a short-circuit wiring part. A current from DC power supply 2 is configured to flow through either of shape memory alloy wire 5a or copper wire 6a selected by switching circuit 4a. It is desirable in view of smaller resistance to use the copper wire as one example of the short-circuit wiring part. However, the present disclosure is not limited thereto, but another conductive material may be used to realize a short circuit of the short-circuit wiring part.

Valve driver 10a is made up of switching circuit 8a as one example of a second selector switch, and linear shape memory alloy wires 9a, 9b, 9c, 9d as examples of second shape memory alloy wires. The current from DC power supply 2 is configured to flow through any one of shape memory alloy wires 9a, 9b, 9c, 9d selected by switching circuit 8a.

Though a detailed description will be given later, shape memory alloy wire 5a in FIG. 1 is used to configure micropump 50a, and shape memory alloy wires 9a, 9b, 9c, 9d are used to configure microvalves 51a, by which fluid conveyance device 1a functions as one example of a driving device of micropump 50a and microvalves 51a.

Valve controller 11a as one example of the valve controller is configured to control operation of switch circuit 3 and switching circuit 8a independently. Pump controller 12a as one example of the pump controller is configured to control operation of switching circuit 4a in accordance with an operation state of valve controller 11a.

Figure 2:
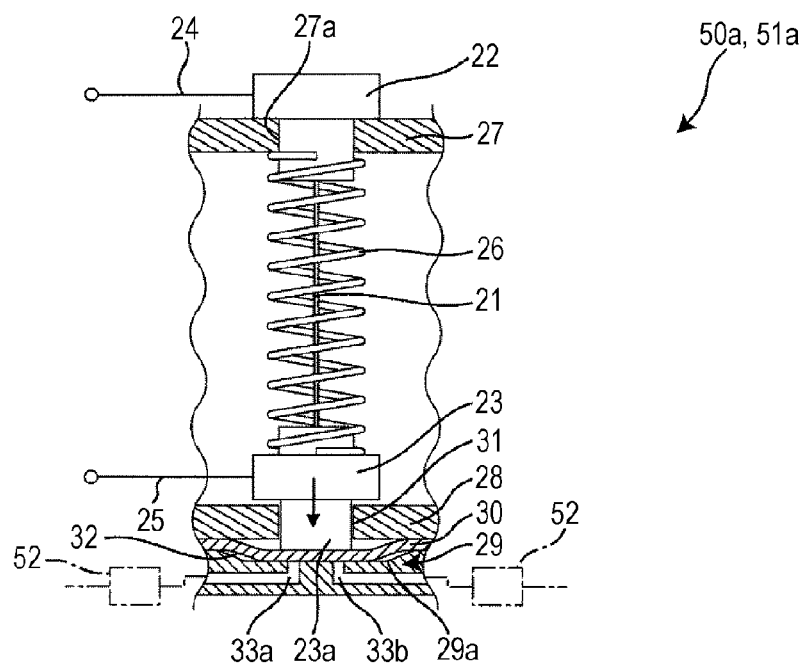
FIG. 2 is a front diagram showing an outline of a driving mechanism in an extended state, the driving mechanism using a shape memory alloy wire that drives each of a micropump and a microvalve in the first embodiment of the present disclosure.
Figure 3:
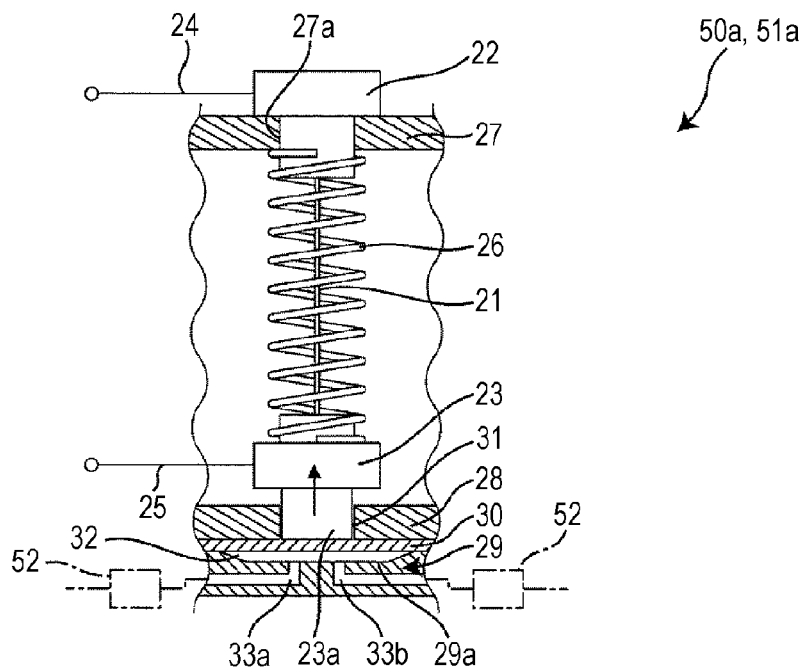
FIG. 3 is a front diagram showing an outline of the driving mechanism in a contracted state, the driving mechanism using the shape memory alloy wire that drives each of the micropump and the microvalve in the first embodiment of the present disclosure.

FIG. 2 shows an outline of a driving mechanism in an extended state, which driving mechanism uses shape memory alloy wire 5a or shape memory alloy wires 9a, 9b, 9c, 9d that drive micropump 50a or microvalves 51a in the first embodiment of the present disclosure. FIG. 3 shows an outline of the driving mechanism in a contracted state, which driving mechanism uses shape memory alloy wire 5a or shape memory alloy wires 9a, 9b, 9c, 9d that drive micropump 50a or microvalves 51a in the first embodiment of the present disclosure. In the driving mechanism in FIGS. 2 and 3, as a representative example of shape memory alloy wire 5a or shape memory alloy wires 9a, 9b, 9c, 9d, shape memory alloy wire 21 will be described. This driving mechanism can function as micropump 50a or microvalve 51a. This driving mechanism also functions as each micropump or each microvalve according to embodiments described later.

Shape memory alloy wire 21 is held by holding member 22 at one end (an upper end in FIGS. 2 and 3), and is held by pressing member 23 at another end (a lower end in FIGS. 2 and 3). Wiring 24 is also held by holding member 22, and shape memory alloy wire 21 and wiring 24 are electrically connected inside holding member 22. Wiring 25 is also held by pressing member 23, and shape memory alloy wire 21 and wiring 25 are electrically connected inside pressing member 23.

Holding member 22 is joined to an inside of through-hole 27a of fixed plate 27 to be fitted and fixed, and is thereby fixed to fixed plate 27 along a surface of fixed plate 27 so as not to be displaced (in a right-left direction in FIGS. 2 and 3). Compression spring 26 is disposed in a compressed state between fixed plate 27 and pressing member 23 with shape memory alloy wire 21 linearly penetrating a central portion of compression spring 26. Thus, compression spring 26 is configured to apply a tension in an extension direction to shape memory alloy wire 21 by a biasing force of compression spring 26.

End portion 23a having a small diameter of pressing member 23 is fitted and disposed so as to be able to freely perform reciprocation operation inside hole 31 provided in pressure plate 28 disposed, for example, parallel to fixed plate 27. End portion 23a of pressing member 23 can reciprocate between a projection position where end portion 23a projects from hole 31 of pressure plate 28, and a withdrawal position where end portion 23a is withdrawn inside hole 31 of pressure plate 28.

Pressure plate 28 and fixed plate 27 are restrained lest mutual relative positions should change. Moreover, pressure plate 28 is fixed such that an outer surface thereof (a lower surface in FIGS. 2 and 3) pushes flow channel substrate 29 through resin film 30, and the biasing force of compression spring 26 prevents pressure plate 28 from floating up from resin film 30.

Thus, resin film 30 is held cohesively to pressure plate 28. As one example, resin film 30 can be made of silicon rubber, acryl resin with a thin portion functioning as a hinge, or the like.

Moreover, in a portion of flow channel substrate 29 opposed to hole 31 of pressure plate 28, depression 29a to form internal space 32 is provided, and in the projection position where end portion 23a of pressing member 23 projects from hole 31 of pressure plate 28, end portion 23a presses resin film 30 and enters depression 29a to cause resin film 30 to adhere to a bottom surface of depression 29a of flow channel substrate 29.

Flow channel substrate 29 has inlet-side flow channel 33a and outlet-side flow channel 33b connected to inlet-side flow channel 33a through internal space 32, and an opening of inlet-side flow channel 33a and an opening of outlet-side flow channel 33b are exposed to internal space 32, and both the openings are simultaneously opened and closed by resin film 30.

That is, when resin film 30 is caused to adhere to the bottom surface of depression 29a of flow channel substrate 29, the opening of inlet-side flow channel 33a and the opening of outlet-side flow channel 33b are sealed by resin film 30 to cut off inlet-side flow channel 33a and outlet-side flow channel 33b. On the other hand, when the adhesion of resin film 30 to the bottom surface of depression 29a of flow channel substrate 29 is released, the opening of inlet-side flow channel 33a and the opening of outlet-side flow channel 33b are released, so that a fluid can be caused to flow from inlet-side flow channel 33a to outlet-side flow channel 33b.

When shape memory alloy wire 21 is not subjected to energization heating, shape memory alloy wire 21 enters the extended state as shown in FIG. 2, and end portion 23a of pressing member 23 is pushed to resin film 30 by the biasing force of compression spring 26. At this time, resin film 30 is deformed until the resin film 30 comes into contact with the bottom surface of depression 29a of flow channel substrate 29, so that a volume of internal space 32 surrounded by resin film 30 and flow channel substrate 29 becomes minimal, and the connection between flow channels 33a, 33b provided in flow channel substrate 29, and internal space 32 is cut off. On the other hand, when shape memory alloy wire 21 is subjected to energization heating, shape memory alloy wire 21 enters the contracted state against the biasing force of compression spring 26, as shown in FIG. 3, and pressing member 23 is displaced upward in FIG. 3 by a force of shape memory alloy wire 21. End portion 23a of pressing member 23 is located at the withdrawal position inside hole 31 of pressure plate 28 in accordance with a displacement amount of pressing member 23, and the deformation of resin film 30 is released, thereby releasing the sealing of flow channels 33a, 33b by resin film 30. Furthermore, the volume of internal space 32 is increasing, and flow channels 33a, 33b and internal space 32 come to connect.

In the case where the driving mechanism shown in FIGS. 2 and 3 is used as micropump 50a, check valves 52 (refer to dashed line in FIGS. 2 and 3) are provided in both flow channels 33a, 33b. For example, when check valves 52 (refer to dashed line in FIGS. 2 and 3) that allow only a flow in a right direction in FIGS. 2 and 3 are provided in both flow channels 33a, 33b, the liquid flows from inlet-side flow channel 33a into internal space 32 in changing from the state in FIG. 2 to the state in FIG. 3, and the liquid flows from internal space 32 to outlet-side flow channel 33b in changing from the state in FIG. 3 to the state in FIG. 2, so that pump operation is performed.

Moreover, when the driving mechanism shown in FIGS. 2 and 3 is used as microvalve 51a, the state in FIG. 2 is a valve-closed state where flow channel 33a and flow channel 33b are cut off, and the state in FIG. 3 is a valve-opened state where flow channel 33a and flow channel 33b are connected.

Micropump 50a is configured by using shape memory alloy wire 5a in FIG. 1 and microvalves 51a are configured by using shape memory alloy wires 9a, 9b, 9c, 9d, by which fluid conveyance device 1a functions as the driving device including micropump 50a and microvalves 51a.

In the first embodiment, all the driving mechanisms that use shape memory alloy wires 5a, 9a, 9b, 9c, 9d to drive micropump 50a and microvalves 51a, respectively have the same structure and action. This is desirable in that design is easy and that characteristics do not change even if driven microvalve 51a is switched.

Figure 4:
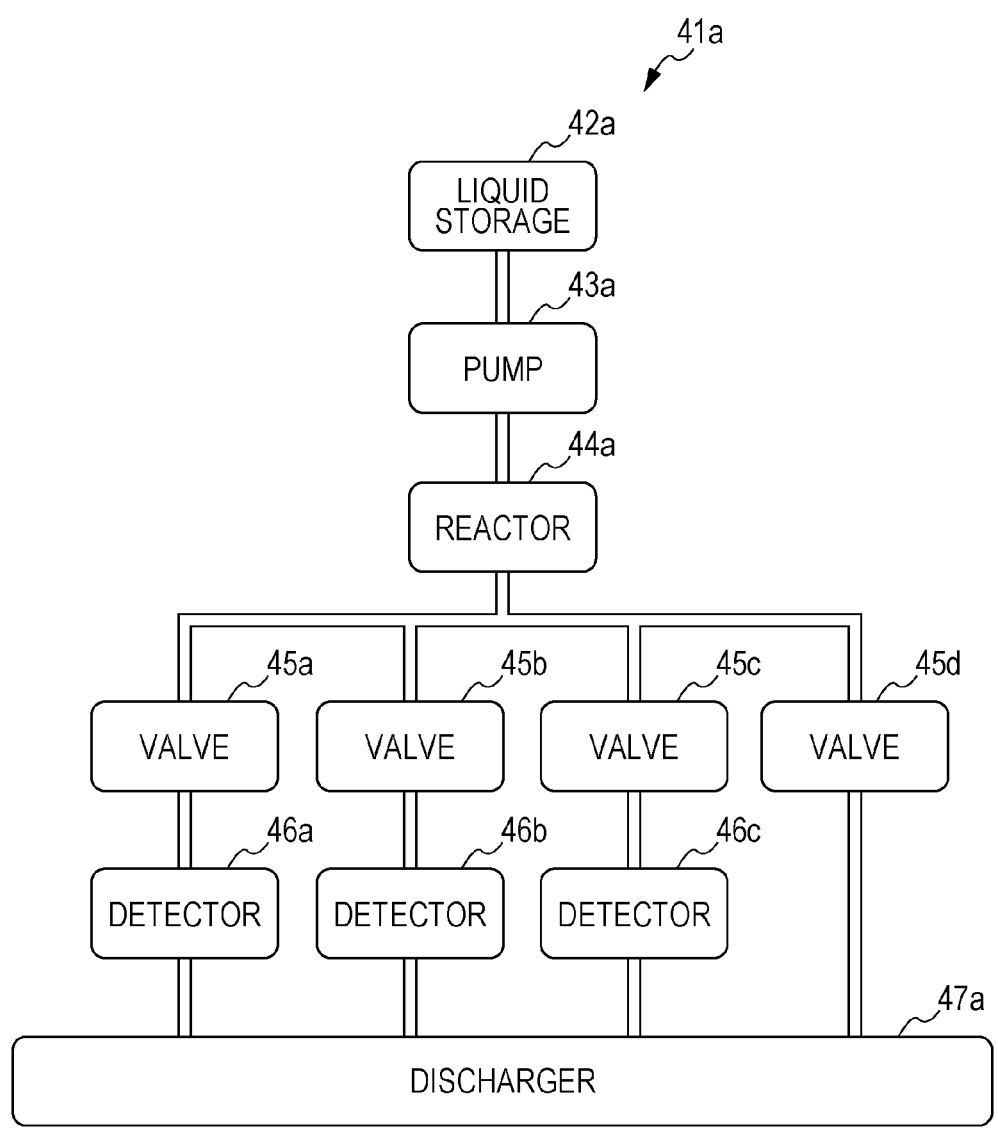
FIG. 4 is a diagram showing an outline of a microfluidic device using the fluid conveyance device in the first embodiment of the present disclosure.

FIG. 4 shows an outline of microfluidic device 41a using fluid conveyance device 1a. As shown in FIG. 4, in microfluidic device 41a, liquid storage 42a, micropump 43a, reactor 44a, microvalves 45a to 45d, detectors 46a, 46b, 46c, and discharger 47a are connected almost in this order. Only microvalve 45d is connected to discharger 47a without going through the detector. Micropump 43a is configured by micropump 50a. Microvalves 45a to 45d are each configured by microvalve 51a. Liquid storage 42a, reactor 44a, detectors 46a, 46b, 46c, and discharger 47a are disposed on flow channel substrate 29.

Microfluidic device 41a sends a liquid stored in liquid storage 42a provided on flow channel substrate 29 to reactor 44a by operating micropump 43a driven by shape memory alloy wire 5a in a state where only microvalve 45d driven by shape memory alloy wire 9d is opened. Opening any one of microvalves 45a, 45b, 45c allows the liquid subjected to reaction processing in reactor 44a to be sent to any one of the detectors 46a, 46b, 46c by operation of micropump 43a, in which microvalve 45a is driven by shape memory alloy wire 9a, microvalve 45b is driven by shape memory alloy wire 9b, and microvalve 45c is driven by shape memory alloy wire 9c. Accordingly, three types of determination processing are performed in detectors 46a, 46b, 46c. The liquid passing through detectors 46a, 46b, 46c, and microvalve 45d is discharged to discharger 47a.

Figure 5:
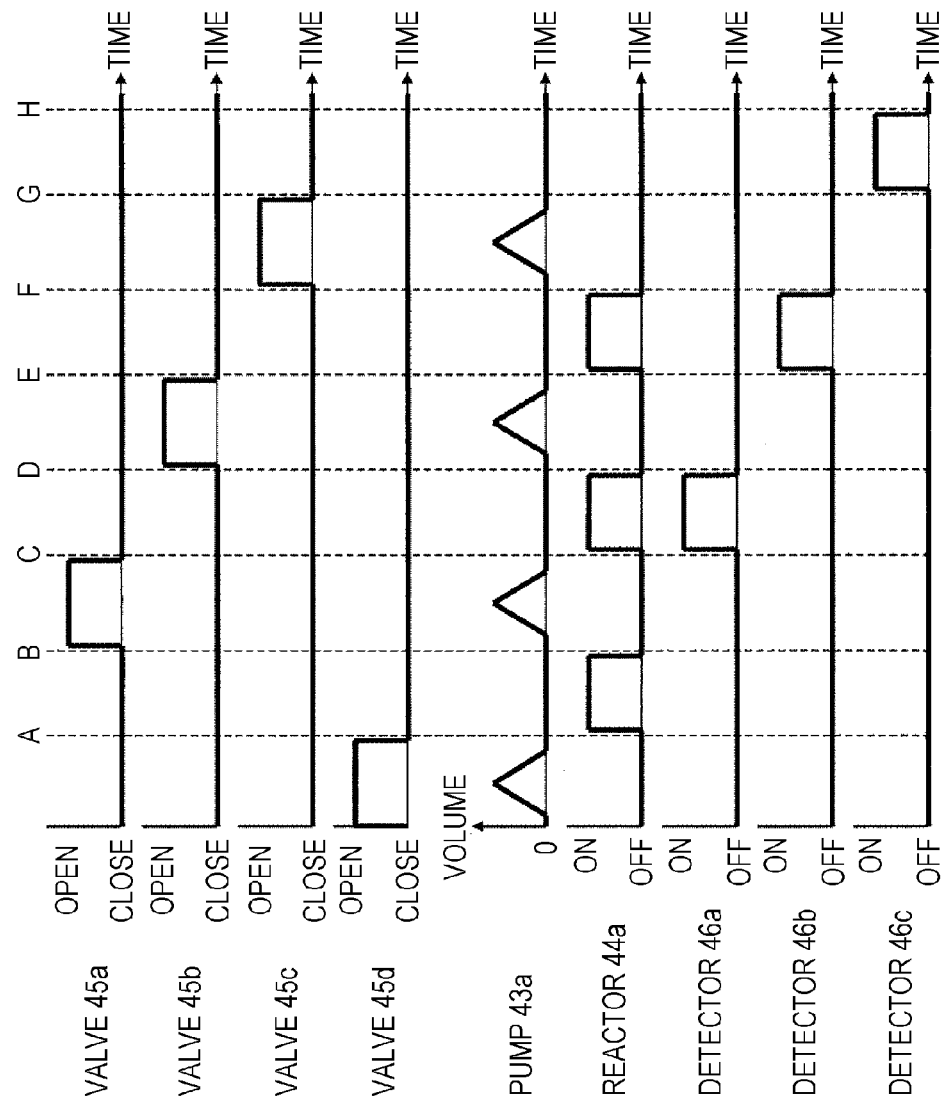
FIG. 5 is a timing chart of operation of the microfluidic device using the fluid conveyance device in the first embodiment of the present disclosure.

FIG. 5 shows a timing chart of operation of microfluidic device 41a.

Microfluidic device 41a first (in a period from liquid sending start in FIG. 5 to time A, e.g., for 20 seconds) opens microvalve 45d, and then performs the pump operation which includes suction operation of increasing a volume of micropump 43*a* (corresponding to the volume of internal space 32 in FIGS. 2 and 3), and discharge operation of reducing the volume of micropump 43*a*. As a result, the liquid is supplied from liquid storage 42*a* to reactor 44*a* through micropump 43*a*, and then, microvalve 45*d* is closed.

Next (between times A and B in FIG. 5, e.g., for 5 minutes), the reaction processing is performed in reactor 44*a*.

Next (between times B and C in FIG. 5, e.g., for 20 seconds), after microvalve 45*a* is opened, the pump operation of micropump 43*a* is performed to send the liquid subjected to the reaction processing in reactor 44*a* to detector 46*a*, and after new liquid is supplied to reactor 44*a* from liquid storage 42*a*, microvalve 45*a* is closed.

Next (between times C and D in FIG. 5, e.g., for 5 minutes), new reaction processing is performed in reactor 44*a*, and the determination processing is performed in detector 46*a*.

Next (between times D and E in FIG. 5, e.g., for 20 seconds), after microvalve 45*b* is opened, the pump operation of micropump 43*a* is performed to send the liquid subjected to the reaction processing in reactor 44*a* to detector 46*b*, and after new liquid is supplied to reactor 44*a* from liquid storage 42*a*, microvalve 45*b* is closed.

Next (between times E and F in FIG. 5, e.g., for 5 minutes), new reaction processing is performed in reactor 44*a*, and the determination processing is performed in detector 46*b*.

Next (between times F and G in FIG. 5, e.g., for 20 seconds), after microvalve 45*c* is opened, the pump operation of micropump 43*a* is performed to send the liquid subjected to the reaction processing in reactor 44*a* to detector 46*c*, and then, microvalve 45*c* is closed.

Finally (between times G and H in FIG. 5, e.g., for 1 minute), the determination processing is performed in detector 46*c*.

Next, action of this fluid conveyance device 1*a* will be described.

In the operation of microfluidic device 41*a* in FIG. 5, when micropump 43*a* performs the pump operation, any one of microvalves 45*a*, 45*b*, 45*c*, 45*d* is necessarily opened. That is, a period when shape memory alloy wire 5*a* that drives micropump 43*a* is energized is necessarily included in a period when any one of shape memory alloy wires 9*a*, 9*b*, 9*c*, 9*d* to drive microvalves 45*a*, 45*b*, 45*c*, 45*d* is energized.

Figure 6:
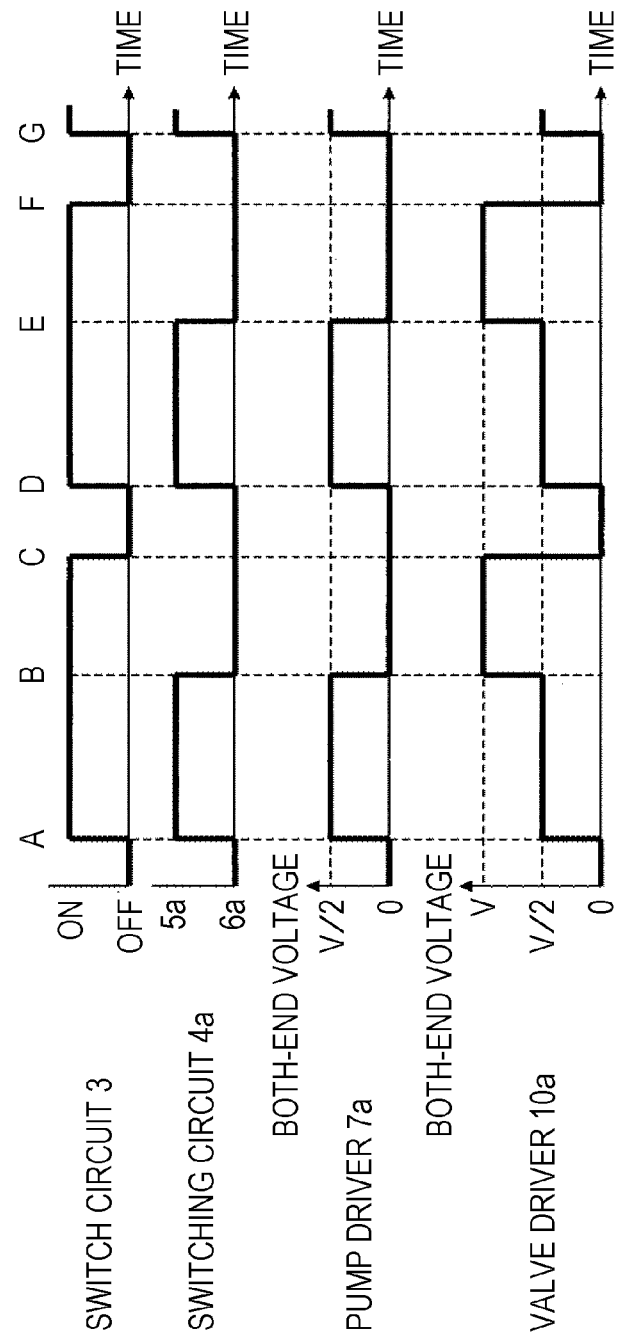
FIG. 6 is a diagram showing a timing chart indicating an energization state during driving the micropump and the microvalves in the first embodiment of the present disclosure.

FIG. 6 is a timing chart indicating an energization state during driving the micropump and the microvalves.

Valve controller 11*a* operates switching circuit 8*a* so that the shape memory alloy wire corresponding to the microvalve that is desired to operate among shape memory alloy wires 9*a*, 9*b*, 9*c*, 9*d* is energized in accordance with the timing chart in FIG. 5.

Thereafter, switch circuit 3 is turned on and off, by which valve driver 10*a* is intermittently energized, and a target one of the microvalves 45*a*, 45*b*, 45*c*, 45*d* is opened. With a period between times A and D and a period between times D and G in FIG. 6 each defined as one cycle (e.g., 1 millisecond), valve controller 11*a* turns on switch circuit 3 only in a period when only enough average electric power to open the respective microvalves is applied (between times A and C and between times D and F in FIG. 6).

At this time, even in a state where a period when switching circuit 4*a* moves to shape memory alloy wire 5*a* becomes maximum, it is desirable to turn on switch circuit 3 only in the period when only enough average electric power to open the microvalves is applied, because switch circuit 3 can be operated at constant timing regardless of the state of the micropump.

In this case, if the period when switching circuit 4*a* moves to shape memory alloy wire 5*a* becomes short, the applied average electric power increases, which raises pressing member 23 from the state in FIG. 3. However, this is not a problem as the operation of the valve. Moreover, as the period when the switching circuit 4*a* is connected to shape memory alloy wire 5*a* (between times A and B, and between times D and E in FIG. 6) is shorter, the period when switch circuit 3 is turned on (between times A and C, and between times D and F in FIG. 6) is shortened to apply only the average electric power required for opening the microvalve. It is desirable in that unnecessary power consumption can be suppressed.

Pump controller 12*a* switches switching circuit 4*a* between shape memory alloy wire 5*a* and copper wire 6*a* in synchronization with the timing when valve controller 11*a* operates switch circuit 3. The period when switching circuit 4*a* is connected to shape memory alloy wire 5*a* (between times A and B, and between times D and E in FIG. 6) is adjusted by pump controller 12*a* in accordance with the target pump volume.

In the first embodiment, since all the driving mechanisms using the shape memory alloy wires that drive micropump 50*a* and microvalves 51*a* have the same structure and action, the electric powers applied to the shape memory alloy wires required for entering the state in FIG. 3 from the state in FIG. 2 are equal.

Accordingly, the maximum time between times A and B and between times D and E in FIG. 6 becomes not longer than time between times A and C, and between times D and F in FIG. 6. Between times A and B and between times D and E in FIG. 6, a voltage applied to both ends of pump driver 7*a* becomes substantially half of voltage V of DC power supply 2.

A voltage applied to both ends of valve driver 10*a* becomes substantially half of voltage V of DC power supply 2 between times A and B and between times D and E in FIG. 6, and becomes voltage V of DC power supply 2 between times B and C and between E and F in FIG. 6.

When intervals between times A and C and between times D and F in FIG. 6 are each set so as to bring into the state in FIG. 3 at voltage V/2, pressing member 23 rises from the state in FIG. 3 because the voltage becomes V between times B and C and between times E and F in FIG. 6. However, this does not pose a problem as the operation of the valve. On the other hand, since in the period when the voltage becomes V, the average electric power becomes four times as large as that at voltage V/2, valve controller 11*a* makes an adjustment so that the intervals between times B and C and between times E and F in FIG. 6 each become 1/4, which makes an average electric power energy constant, and maintains the state in FIG. 3.

As one example, when shape memory alloy wires 5*a*, 9*a*, 9*b*, 9*c*, 9*d* each have a length of 10 mm and a diameter of 150 μm, and when the voltage of DC power supply 2 is 1 V, a duty ratio to apply the electric power equivalent to continuous energization of 0.21 V to shape memory alloy wire 5*a* is about 18%, so that a range of the duty ratio that can be used to control the pump volume can become four times without any loss by resistance.

<Effects>

According to the configuration of the first embodiment, only during the energization to any one of shape memory alloy wires 9*a*, 9*b*, 9*c*, 9*d* for microvalve driving, shape memory alloy wire 5a for micropump driving is energized. Therefore, in contrast to microvalves 45a, 45b, 45c, 45d of on and off operation, during the driving of micropump 43a requiring volume control, shape memory alloy wire 5a for micropump operation is driven at the voltage of DC power supply 2 divided by resistances of shape memory alloy wires 9a, 9b, 9c, 9d for microvalve operation. As a result, the control of the pump volume becomes easy. Moreover, since the voltage dividing is realized by the resistances of shape memory alloy wires 9a, 9b, 9c, 9d corresponding to driven microvalves 45a, 45b, 45c, 45d, wasteful loss is not caused. Thus, fluid conveyance device 1a that easily realizes the control of the pump volume and reduces loss can be attained.

The characteristics of the first embodiment will be described in more detail. In the following description, a method for opening the micropump and the microvalves included in fluid conveyance device 1a according to the first embodiment will be described. This method includes step (a) and step (b).

(Step (a))

In step (a), fluid conveyance device 1a according to the first embodiment is prepared as described above. In other words, a user of the fluid conveyance device 1a gets ready for the fluid conveyance device 1a.

(Step (b))

In step (b), following steps (b1) and (b2) are repeated.

First, in step (b1), switching circuit 4a is connected to shape memory alloy wire 5a, and switching circuit 8a is connected to shape memory alloy wire 9a. In this manner, voltage V is applied to shape memory alloy wires 5a, 9a connected in series from power supply part 2 for given time. This corresponds to the section between A and B and the section between D and E in FIG. 6. When shape memory alloys 5a, 9a have the same resistance, the voltage of 1/2 V is applied to shape memory alloys 5a, 9a.

Next, in step (b2), switching circuit 4a is connected to copper wire 6a. Switching circuit 8a remains connected to shape memory alloy wire 9a. In this manner, copper wire 6a and shape memory alloy wire 9a are electrically connected in series. Voltage V supplied from power supply part 2 is applied only to shape memory alloy wire 9a without being applied to shape memory alloy wire 5a. Accordingly, voltage V is applied to shape memory alloy wire 9a. This corresponds to the section between B and C and the section between E and F.

These steps (b1) and (b2) are repeated.

Since, generally, the shape memory alloy contracts when being heated, the shape memory alloy heated by the application of the voltage contracts. As is clear from the foregoing description and FIG. 6, since more voltage is applied to shape memory alloy wire 9a than shape memory alloy wire 5a, microvalve 51a is first opened, and micropump 50a is subsequently opened while repeating steps (b1) and (b2). In this manner, the fluid flows in fluid conveyance device 1a without wastefully losing the voltage. Needless to say, it should be noted that even if micropump 50a is opened, the fluid does not flow unless microvalve 51a is opened.

(Steps (b3) and (b4))

In a quiescent time to prevent shape memory alloy wire 9a from being heated too much, while the reaction is performed in reactor 44a, or while detection is performed in detectors 46a, 46b, 46c, switch circuit 3a may be turned off. This corresponds to the section between C and D and the section between F and G in FIG. 6. In this manner, after step (b2), by turning off switch circuit 3a, a current flowing in pump driver 7a and valve driver 10a from power supply part 2 is turned off. This corresponds to time C and time F in FIG. 6.

Thereafter, by turning on switch circuit 3a, the current flowing in pump driver 7a and valve driver 10a from power supply part 2 is turned on. This corresponds to time D and time G in FIG. 6.

Generally, the shape memory alloy is extended by being cooled. For this reason, if a state where voltage is not applied is kept, both of micropump 50a and microvalve 51a close spontaneously due to the force of the compression spring 26 in FIG. 2.

While in the first embodiment, DC power supply 2, switch circuit 3, pump driver 7a, and valve driver 10a are arranged in series in the order in FIG. 1, the present disclosure is not limited thereto, and they may be arranged in series in arbitrary order. Similarly, as to the arrangement in series inside pump driver 7a or inside valve driver 10a as well, the arrangement in series in arbitrary order may be employed.

While in the first embodiment, four shape memory alloy wires 9a, 9b, 9c, 9d for microvalve driving are arranged in parallel, the present disclosure is not limited thereto. A number of the shape memory alloy wires to be switched may be changed in accordance with a number of the microvalves used in the driven fluid device.

While in the first embodiment, the connection between shape memory alloy wire 5a and copper wire 6a is switched by switching circuit 4a, the present disclosure is not limited thereto. The connection to copper wire 6a may be turned on and off while maintaining the connection to shape memory alloy wire 5a.

While in the first embodiment, in each of the driving mechanisms using shape memory alloy wires, linear shape memory alloy wire 21 is used, the present disclosure is not limited thereto. A coil-like shape memory alloy wire may be employed.

While in the first embodiment, coil-like compression spring 26 is used to generate the tension in the extended direction in shape memory alloy wire 21, the present disclosure is not limited thereto. Any well-known elastic mechanism bringing about similar actions and effects can be used.

While in the first embodiment, resin film 30 is directly deformed by pressing member 23 driven by shape memory alloy wire 21, the present disclosure is not limited thereto. Resin film 30 may be indirectly deformed through any well-known mechanism. In this case, an operation direction may be inversed to change from operation of normally closing as in the first embodiment to operation of normally opening.

While in the first embodiment, the configuration is such that when the liquid is first sent to reactor 44a, microvalve 45d directly connected to discharger 47a is used, the present disclosure is not limited thereto. The configuration may be such that any one of microvalves 45a, 45b, 45c is opened to first send the liquid to reactor 44a without using microvalve 45d.

While in the first embodiment, the operation of micropump 43a is performed in the same volume change pattern one cycle every time, the present disclosure is not limited thereto. Volume change patterns different in maximum volume or change time may be used, or the pump operation may be performed a plurality of times in accordance with the configuration of the fluid device.

While in the first embodiment, the reaction processing in reactor 44a and the determination processing in detectors 46a, 46b are performed simultaneously, the present disclosure is not limited thereto. After the one is performed, the other may be performed.

While in the first embodiment, all the driving mechanisms using the shape memory alloy wires that drive micropump 50a and microvalves 51a have the same structure and action, the present disclosure is not limited thereto. Different driving mechanisms may be used to similarly carry out the driving as long as the configuration is such that the maximum time between times A and B and between times D and E in FIG. 6 becomes not longer than the time between times A and C and between times D and F in FIG. 6 under an actual operating environment.

Second Embodiment

Configuration

Figure 7:
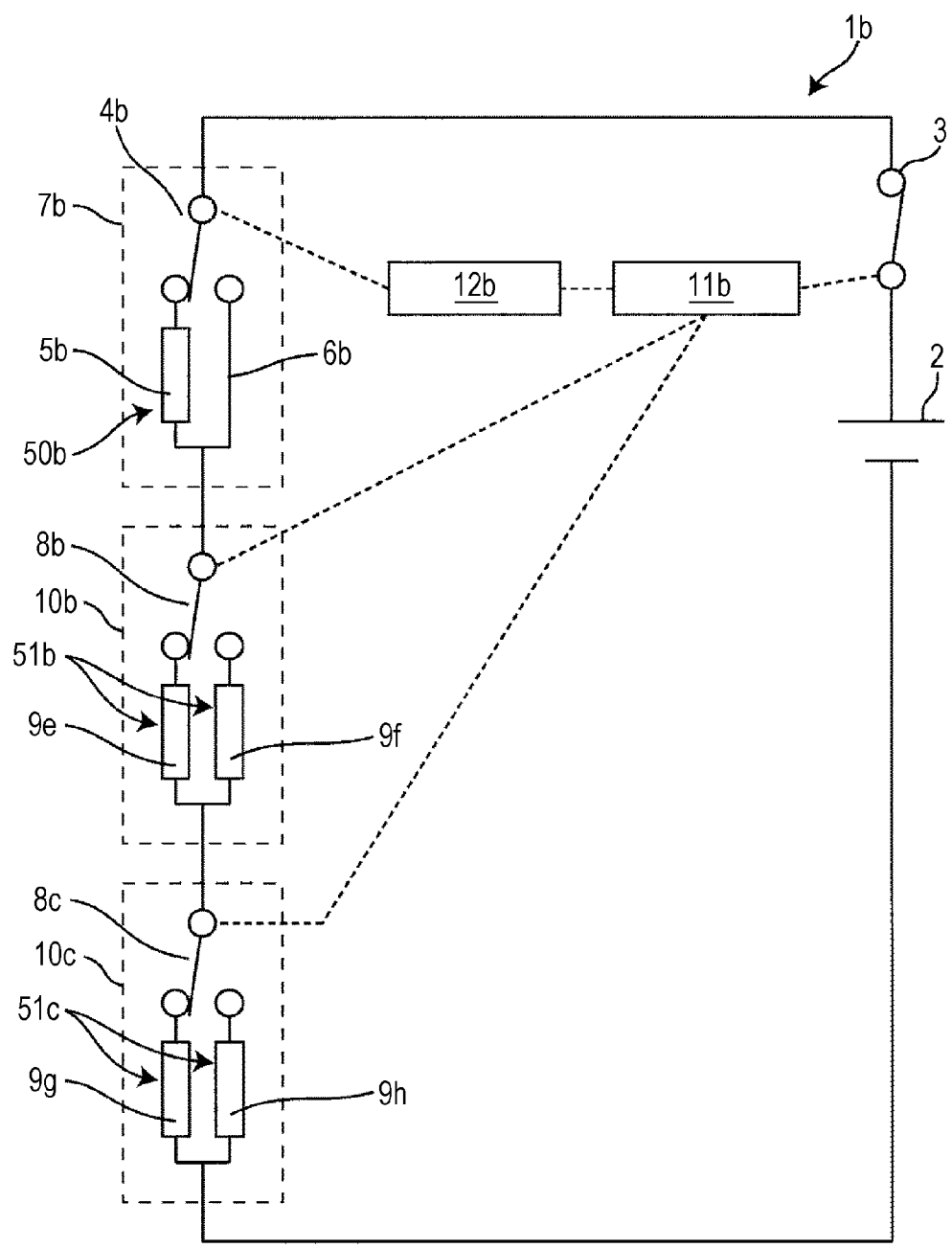
FIG. 7 is a diagram showing an outline of a fluid conveyance device in a second embodiment of the present disclosure.

FIG. 7 shows an outline of fluid conveyance device 1b functioning as one example of a driving device of a micropump and a microvalve in a second embodiment of the present disclosure.

Fluid conveyance device 1b includes at least pump driver 7b, valve driver 10b, valve driver 10c, a power supply part, a switch part, valve controller 11b, and pump controller 12b. In fluid conveyance device 1b, the power supply part, the switch part, pump driver 7b, valve driver 10b, and valve driver 10c are connected in series.

Fluid conveyance device 1b is driven by DC power supply 2 as one example of the power supply part. Only when switch circuit 3 as one example of the switch part connected to DC power supply 2 is on, a current flows in fluid conveyance device 1b. At this time, the current from DC power supply 2 also flows through pump driver 7b and valve drivers 10b, 10c, which are connected to switch circuit 3 in series.

Pump driver 7b is made up of switching circuit 4b as one example of a first selector switch, linear shape memory alloy wire 5b as one example of a first shape memory alloy wire, and copper wire 6b as one example of a short-circuit wiring part. The current from DC power supply 2 is configured to flow through either of shape memory alloy wire 5b and copper wire 6b selected by switching circuit 4b. It is desirable in view of smaller resistance to use the copper wire as one example of the short-circuit wiring part. However, the present disclosure is not limited thereto, and another conductive material may be used to realize a short circuit of the short-circuit wiring part.

Moreover, valve driver 10b is made up of switching circuit 8b as one example of a second selector switch, and linear shape memory alloy wires 9e, 9f as examples of second shape memory alloy wires. The current from DC power supply 2 is configured to flow through any one of shape memory alloy wires 9e, 9f selected by switching circuit 8b.

Moreover, valve driver 10c is made up of switching circuit 8c as one example of the second selector switch, and linear shape memory alloy wires 9g, 9h as examples of the second shape memory alloy wires. The current from DC power supply 2 is configured to flow through any one of shape memory alloy wires 9g, 9h selected by switching circuit 8c.

Shape memory alloy wire 5b in FIG. 7 is used to configure micropump 50b, shape memory alloy wires 9e, 9f are used to configure microvalves 51b, and shape memory alloy wires 9g, 9h are used to configure microvalves 51c. Thus, fluid conveyance device 1b functions as one example of a driving device including micropump 50b and microvalves 51b, 51c.

Valve controller 11b as one example of a valve controller is configured so as to control operation of switch circuit 3 and switching circuits 8b, 8c independently. Moreover, pump controller 12b as one example of a pump controller is configured so as to control operation of switching circuit 4b in accordance with an operation state of valve controller 11b.

Shape memory alloy wire 5b in FIG. 7 is used to configure micropump 50b similar to micropump 50a of the first embodiment, and shape memory alloy wires 9e, 9f, 9g, 9h are used to configure microvalves 51b, 51c similar to microvalves 51a of the first embodiment. Thus, fluid conveyance device 1b functions as the driving device including micropump 50b and microvalves 51b, 51c.

In the second embodiment, all the driving mechanisms that use the shape memory alloy wires to drive micropump 50b and microvalves 51b, 51c have the same structure and action. This is desirable in that design is easy, and that characteristics do not change even if the driven microvalve is switched.

Figure 8:
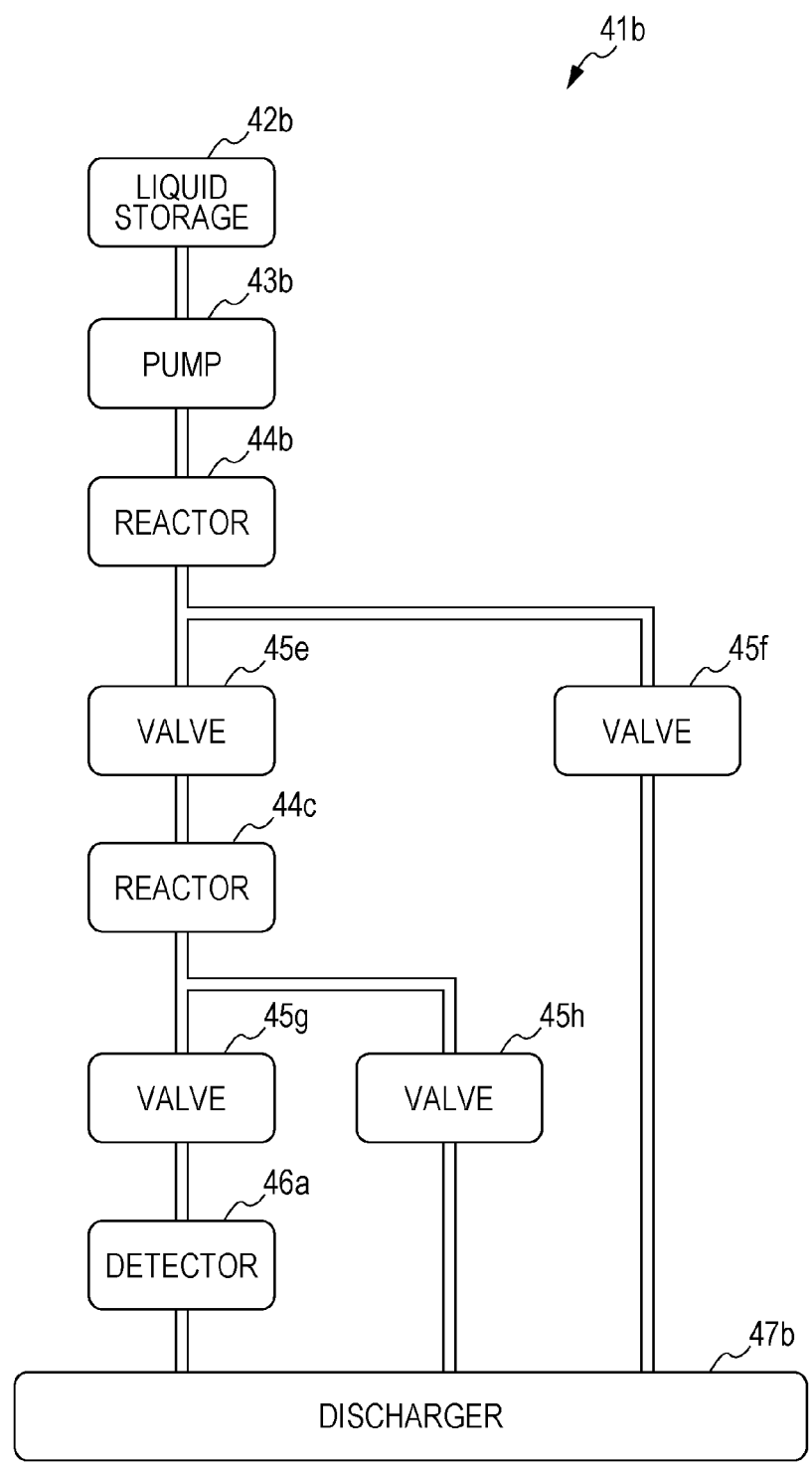
FIG. 8 is a diagram showing an outline of a microfluidic device using the fluid conveyance device in the second embodiment of the present disclosure.

FIG. 8 shows an outline of microfluidic device 41b using fluid conveyance device 1b. As shown in FIG. 8, in microfluidic device 41b, liquid storage 42b, micropump 43b, first reactor 44b, microvalves 45e, 45f, second reactor 44c, microvalves 45g, 45h, detector 46d, and discharger 47b are connected almost in this order. Microvalves 45f, 45h are connected to discharger 47b without going through the detector and the like. Micropump 43b is configured by micropump 50b. Microvalves 45e, 45f are each configured by microvalve 51b. Microvalves 45g, 45h are each configured by microvalve 51c. Liquid storage 42b, first reactor 44b, second reactor 44c, detector 46d, and discharger 47b are arranged on flow channel substrate 29.

Microfluidic device 41b operates micropump 43b driven by shape memory alloy wire 5b in a state where microvalve 45f driven by shape memory alloy wire 9f is opened to send a liquid stored in liquid storage 42b provided on flow channel substrate 29 to first reactor 44b. Opening microvalve 45e and microvalve 45h allows the liquid subjected to reaction processing in first reactor 44b to be sent to second reactor 44c by operation of micropump 43b, in which microvalve 45e is driven by shape memory alloy wire 9e, and microvalve 45h is driven by shape memory alloy wire 9h. Opening microvalve 45e and microvalve 45g allows the liquid subjected to additional reaction processing in second reactor 44c to be sent to detector 46d by the operation of micropump 43b, in which microvalve 45g is driven by shape memory alloy wire 9g. Accordingly, determination processing of the liquid subjected to two types of reaction processing in first reactor 44b and second reactor 44c is performed in detector 46d. The liquid passing through detector 46d or microvalve 45f or 45h is discharged to discharger 47b.

Figure 9:
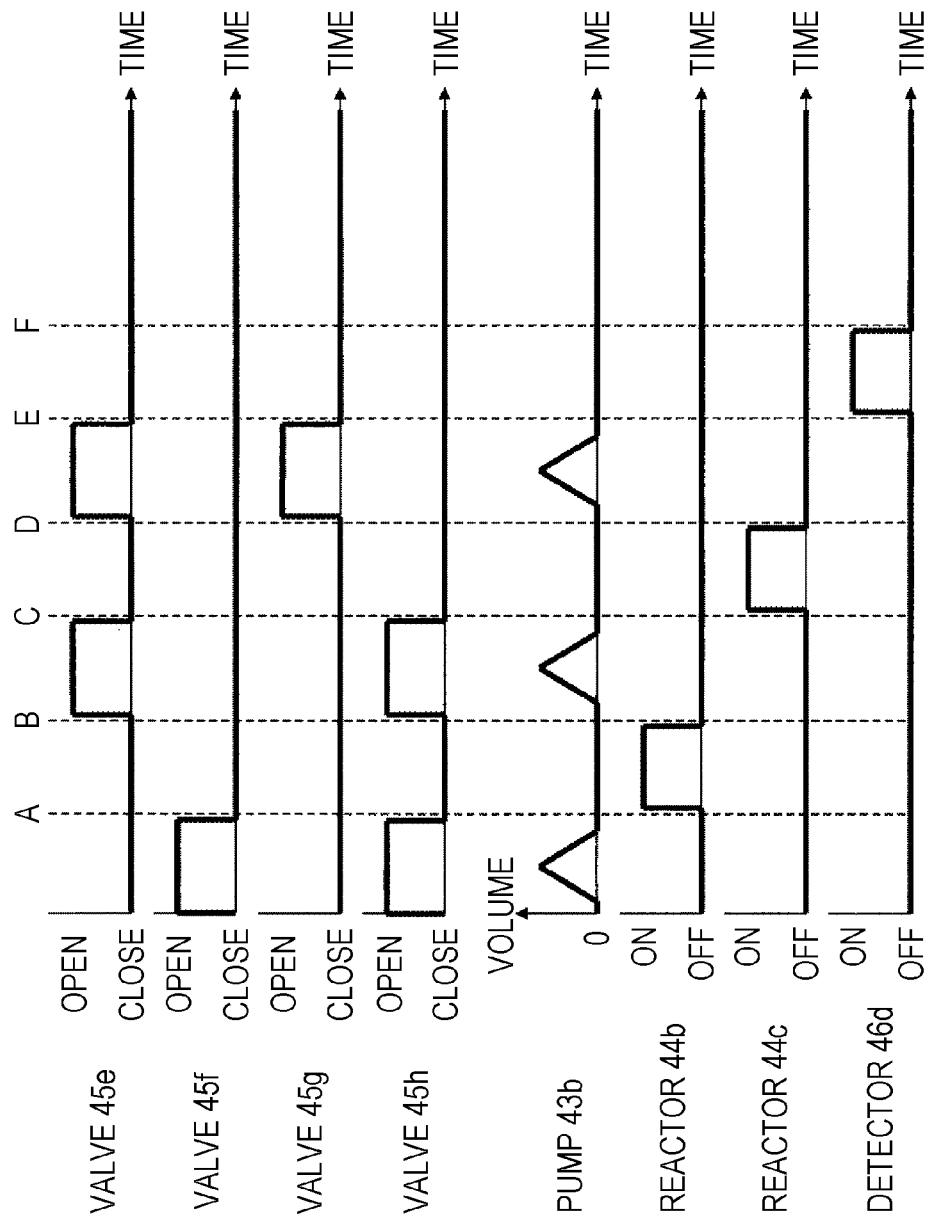
FIG. 9 is a timing chart of operation of the microfluidic device using the fluid conveyance device in the second embodiment of the present disclosure.

FIG. 9 shows a timing chart of operation of microfluidic device 41b.

Microfluidic device 41b first (in a period from liquid sending start to time A in FIG. 9, e.g., for 20 seconds) opens microvalves 45f, 45h, and then performs the pump operation which includes suction operation of increasing a volume of micropump 43b (corresponding to the volume of internal space 32 in FIGS. 2 and 3), and discharge operation of reducing the volume of micropump 43b. As a result, the liquid is supplied from liquid storage 42b to first reactor 44b through micropump 43b, and then microvalve 45f is closed.

Next (between times A and B in FIG. 9, e.g., for 5 minutes), the reaction processing is performed in first reactor 44b.

Next (between times B and C in FIG. 9, e.g., for 20 seconds), after microvalves 45e, 45h are opened, the pump operation of micropump 43b is performed to send the liquid subjected to the reaction processing in first reactor 44b to second reactor 44c, and then microvalves 45e, 45h are closed.

Next (between times C and D in FIG. 9, e.g., for 5 minutes), the second reaction processing is performed in second reactor 44c.

Next (between times D and E in FIG. 9, e.g., for 20 seconds), after microvalves 45e, 45g are opened, the pump operation of micropump 43b is performed to send the liquid subjected to the reaction processing in second reactor 44c to detector 46d, and then microvalves 45e, 45g are closed.

Next (between times E and F in FIG. 9, e.g., for 1 minute), the determination processing is performed in detector 46d.

Next, action of this fluid conveyance device 1b will be described.

In the operation of microfluidic device 41b in FIG. 9, when micropump 43b performs the pump operation, the two microvalves, that is, microvalve 45e or 45f, and microvalve 45g or 45h are necessarily opened. That is, a period when shape memory alloy wire 5b that drives micropump 43b is energized is necessarily included in a period when the two shape memory alloy wires, that is, shape memory alloy wire 9e or 9f to drive microvalve 45e or 45f, shape memory alloy wire 9g or 9h to drive microvalve 45g or 45h are energized.

Figure 10:
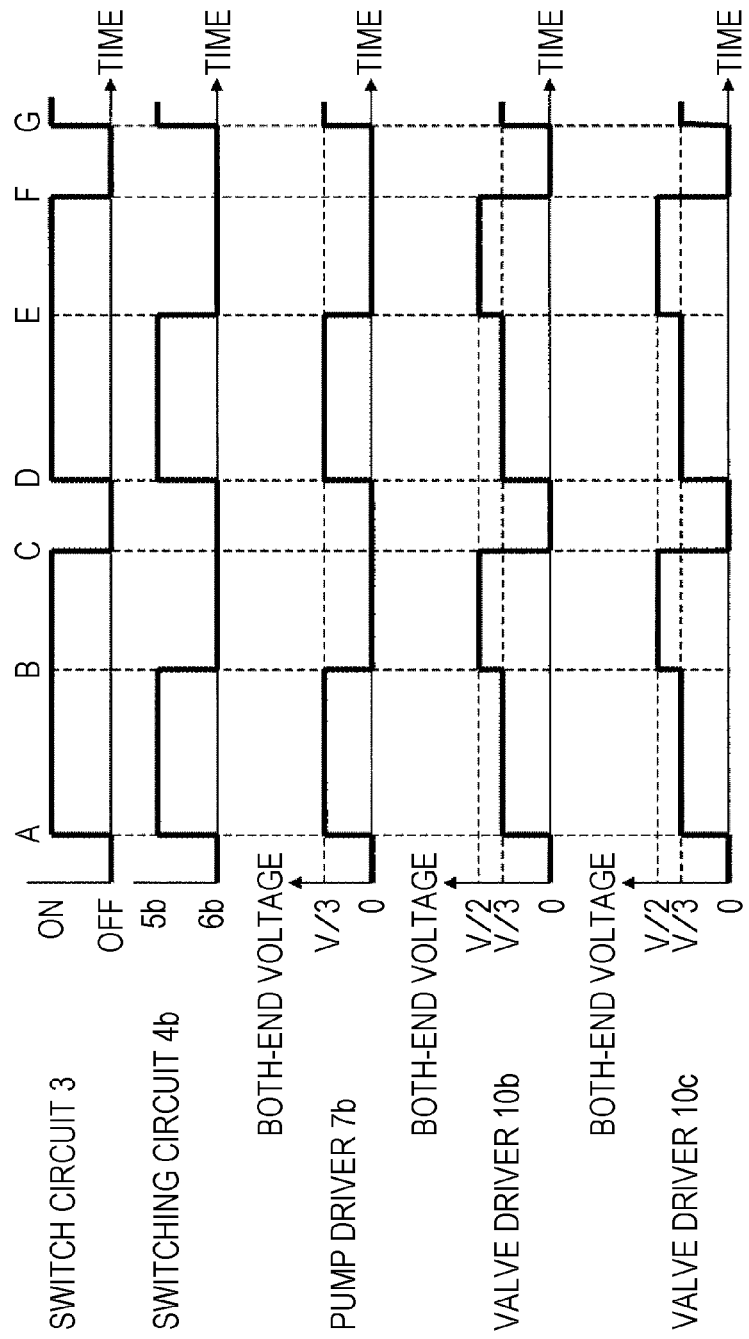
FIG. 10 is a diagram showing a timing chart indicating an energization state during driving a micropump and microvalves in the second embodiment of the present disclosure.

FIG. 10 is a timing chart indicating an energization state during driving the micropump and the microvalves.

Valve controller 11b operates switching circuit 8b so that the shape memory alloy wire corresponding to the microvalve that is desired to operate of shape memory alloy wires 9e, 9f is energized in accordance with the timing chart in FIG. 9, and operates switching circuit 8c so that the shape memory alloy wire corresponding to the microvalve that is desired to operate of shape memory alloy wires 9g, 9h is energized.

Thereafter, switch circuit 3 is turned on and off, by which valve drivers 10b, 10c are intermittently energized, and the target two of the microvalve 45e or 45f, and microvalve 45g or 45h are opened. With a period between times A and D and a period between times D and G in FIG. 10 each defined as one cycle (e.g., 1 millisecond), valve controller 11b turns on switch circuit 3 only in a period when only enough average electric power to open the respective microvalves is applied (between times A and C and between times D and F in FIG. 10).

At this time, even in a state where a period when switching circuit 4b moves to shape memory alloy wire 5b becomes maximum, it is desirable to turn on switch circuit 3 only in the period when only enough average electric power to open the microvalves is applied, because switch circuit 3 can be operated at constant timing regardless of the state of the micropump.

In this case, if the period when switching circuit 4b moves to shape memory alloy wire 5b becomes short, the applied average electric power increases, which raises pressing member 23 from the state in FIG. 3. However, this is not a problem as the operation of the valve. Moreover, as the period when the switching circuit 4b is connected to shape memory alloy wire 5b (between times A and B, and between times D and E in FIG. 10) is shorter, the period when switch circuit 3 is turned on (between times A and C, and between times D and F in FIG. 10) is shortened to apply only the average electric power required for opening the microvalves. It is desirable in that unnecessary power consumption can be suppressed.

Pump controller 12b switches switching circuit 4b between shape memory alloy wire 5b and copper wire 6b in synchronization with the timing when valve controller 11b operates switch circuit 3. The period when switching circuit 4b is connected to shape memory alloy wire 5b (between times A and B, and between times D and E in FIG. 10) is adjusted by pump controller 12b in accordance with the target pump volume. In the second embodiment, since all the driving mechanisms using the shape memory alloy wires that drive micropump 50b and microvalves 51b, 51c have the same structure and action, the electric powers applied to the shape memory alloy wires required for entering the state in FIG. 3 from the state in FIG. 2 are equal.

Accordingly, the maximum time between times A and B and between times D and E in FIG. 10 becomes not longer than time between times A and C, and between times D and F in FIG. 10. Between times A and B and between time D and E in FIG. 10, a voltage applied to both ends of pump driver 7b becomes substantially 1/3 of voltage V of DC power supply 2.

Voltages applied to both ends of valve drivers 10b, 10c each become substantially 1/3 of voltage V of DC power supply 2 between times A and B and between times D and E in FIG. 10, and becomes substantially 2/3 of voltage V of DC power supply 2 between times B and C and between times E and F in FIG. 10. When intervals between times A and C and times D and F in FIG. 10 are each set so as to bring into the state in FIG. 3 at voltage V/3, pressing member 23 rises from the state in FIG. 3 because the voltage becomes V/2 between times B and C and between times E and F in FIG. 10. However, this does not pose a problem as the operation of the valve. On the other hand, since in the period when the voltage becomes V/2, the average electric power becomes 2.25 times as large as that at voltage V/3, valve controller 11b makes an adjustment so that the intervals between times B and C and between times E and F in FIG. 10 each become 1/2.25, which makes an average electric power energy constant, and maintains the state in FIG. 3.

As one example, when shape memory alloy wires 5b, 9e, 9f, 9g, 9h each have a length of 10 mm and a diameter of 150 μm, and when the voltage of DC power supply 2 is 1 V, a duty ratio to apply the electric power equivalent to continuous energization of 0.21 V to shape memory alloy wire 5b is about 40%, so that a range of the duty ratio that can be used to control the pump volume can become nine times without any loss by the resistance.

<Effects>

According to the configuration of the second embodiment, only during the energization to the two shape memory alloy wires, that is, shape memory alloy wire 9e or 9f for microvalve driving, and shape memory alloy wire 9g or 9h for microvalve driving, shape memory alloy wire 5b for micropump driving is energized. Therefore, in contrast to microvalves 45e, 45f, 45g, 45h of on/off operation, during the driving of micropump 43b requiring volume control, shape memory alloy wire 5b for micropump operation is driven at the voltage of DC power supply 2 divided by resistances of shape memory alloy wires 9e, 9f, 9g, 9h for microvalve operation. As a result, the control of the pump volume becomes easy. Moreover, since the voltage dividing is realized by the resistances of shape memory alloy wires 9e, 9f, 9g, 9h corresponding to driven microvalves 45e, 45f, 45g, 45h, wasteful loss is not caused. Thus, fluid conveyance device 1b that easily realizes the control of the pump volume, and reduces loss can be attained.

The characteristics of the second embodiment will be described in more detail. In the second embodiment, fluid conveyance device 1b further includes valve driver 10c, as shown in FIG. 7. Valve driver 10c is connected to valve driver 10b in series. Similarly to valve driver 10b, valve driver 10c also has the plurality of shape memory alloy wires 9g, 9h, a plurality of microvalves 51c that perform valve operation with extension and contraction of the plurality of shape memory alloy wires 9g, 9h, and switching circuit 8c that brings into a state where either of shape memory alloy wires 9g, 9h can be energized.

Pump driver 7b and valve driver 10b are the same as pump driver 7a and valve driver 10a in the first embodiment, respectively. Accordingly, operation of pump driver 7b and valve driver 10b is also the same as the operation of pump driver 7a and valve driver 10a in the first embodiment. Thus, operation of valve driver 10c will be described.

In step (b1) of the second embodiment, shape memory alloy wire 9g is selected from the plurality of microvalves 51c through switching circuit 8c. The voltage supplied from power supply part 2 is applied to selected shape memory alloy wire 9g for given time. In this manner, selected shape memory alloy wire 9g is heated. This corresponds to the section between A and B and the section between D and E in FIG. 10.

In step (b2) also, the voltage supplied from power supply part 2 is applied to selected shape memory alloy wire 9g. In this manner, selected shape memory alloy wire 9g is heated. This corresponds to the section between B and C and the section between E and F in FIG. 10.

Microvalves 51b, 51c are first opened, and micropump 50b is subsequently opened while steps (b1) and (b2) are repeated. As in the first embodiment, in the second embodiment as well, in this manner, the fluid flows in fluid conveyance device 1b without wastefully losing the voltage.

While in the second embodiment, DC power supply 2, switch circuit 3, pump driver 7b, and valve drivers 10b, 10c are arranged in series in the order in FIG. 7, the present disclosure is not limited thereto, and they may be arranged in series in arbitrary order. Similarly, as to the arrangement in series inside pump driver 7b or inside valve drivers 10b, 10c as well, the arrangement in series in arbitrary order may be employed.

While in the second embodiment, the two shape memory alloy wires for microvalve driving are arranged in parallel, the present disclosure is not limited thereto. A number of the shape memory alloy wires to be switched may be changed in accordance with a number of the microvalves used in the driven fluid device.

While in the second embodiment, the connection between shape memory alloy wire 5b and copper wire 6b is switched by switching circuit 4b, the present disclosure is not limited thereto. The connection to copper wire 6b may be turned on and off while maintaining the connection to shape memory alloy wire 5b.

While in the second embodiment, valve 45h is opened until time A in FIG. 9, even when valve 45h can be replaced by valve 45g, the same operation can be carried out.

While in the second embodiment, the operation of micropump 43b is performed in the same volume change pattern one cycle every time, the present disclosure is not limited thereto. Volume change patterns different in maximum volume or change time may be used, or the pump operation may be performed a plurality of times in accordance with the configuration of the fluid device.

While in the second embodiment, all the driving mechanisms using the shape memory alloy wires that drive micropump 50b and microvalves 51b, 51c have the same structure and action, the present disclosure is not limited thereto. Different driving mechanisms may be used to similarly carry out the driving as long as the configuration is such that maximum time between times A and B and between times D and E in FIG. 10 becomes not longer than the time between times A and C and between times D and F in FIG. 10 under an actual operating environment.

Third Embodiment

Configuration

Figure 11:
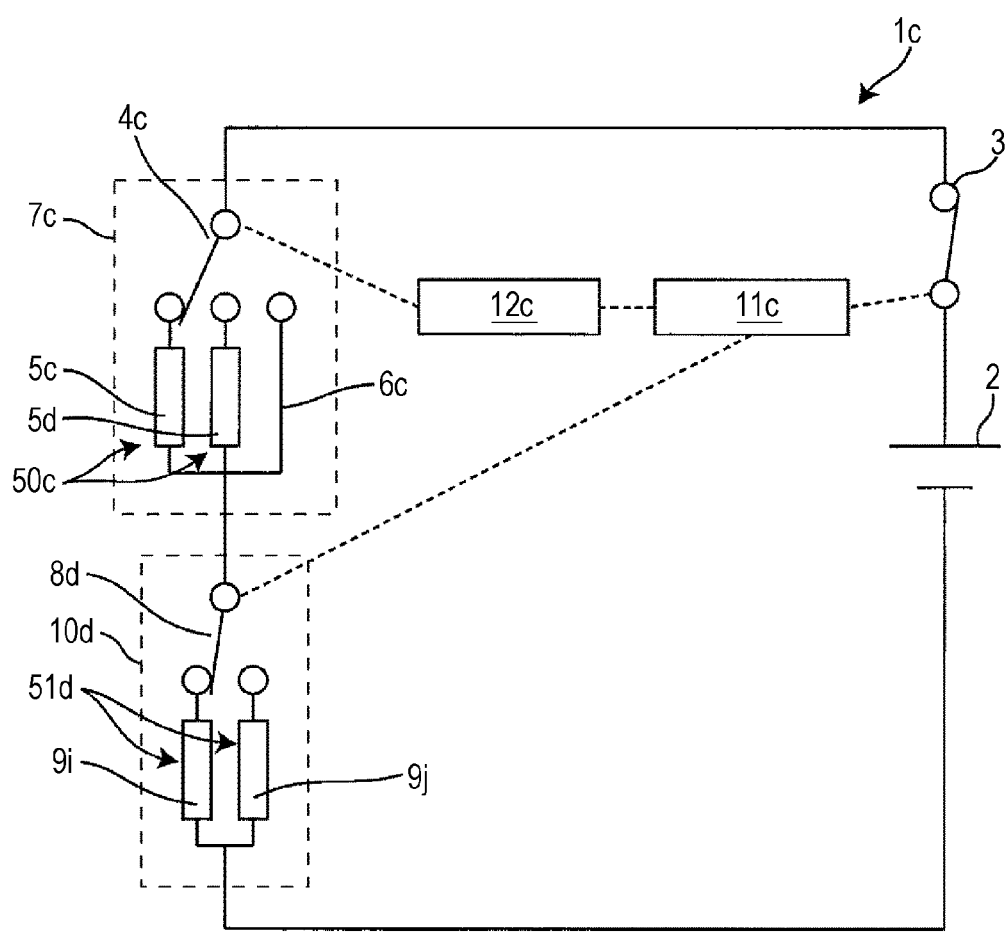
FIG. 11 is a diagram showing an outline of a fluid conveyance device in a third embodiment of the present disclosure.

FIG. 11 shows an outline of fluid conveyance device 1c functioning as one example of a driving device of a micropump and a microvalve in a third embodiment of the present disclosure.

Fluid conveyance device 1c includes at least pump driver 7c, valve driver 10d, a power supply part, a switch part, valve controller 11c, and pump controller 12c. In fluid conveyance device 1c, pump driver 7c, valve driver 10d, the power supply part, and the switch part are connected in series.

Fluid conveyance device 1c is driven by DC power supply 2 as one example of the power supply part. Only when switch circuit 3 as one example of the switch part connected to DC power supply 2 is on, a current flows in fluid conveyance device 1c. At this time, the current from DC power supply 2 also flows through pump driver 7c and valve driver 10d, which are connected to switch circuit 3 in series.

Pump driver 7c is made up of switching circuit 4c as one example of a first selector switch, linear shape memory alloy wires 5c, 5d as examples of first shape memory alloy wires, and copper wire 6c as one example of a short-circuit wiring part. A current from DC power supply 2 is configured to flow through any one of shape memory alloy wires 5c, 5d and copper wire 6c selected by switching circuit 4c. It is desirable in view of smaller resistance to use the copper wire as one example of the short-circuit wiring part. However, the present disclosure is not limited thereto, and another conductive material may be used to realize a short circuit of the short-circuit wiring part.

Moreover, valve driver 10d is made up of switching circuit 8d as one example of a second selector switch, and linear shape memory alloy wires 9i, 9j as examples of second shape memory alloy wires. The current from DC power supply 2 is configured to flow through either of shape memory alloy wires 9i, 9j selected by switching circuit 8d.

Shape memory alloy wires 5c, 5d in FIG. 11 are used to configure micropumps 50c, and shape memory alloy wires 9i, 9j are used to configure microvalves 51d, by which fluid conveyance device 1c functions as one example of a driving device including micropumps 50c and microvalves 51d.

Valve controller 11c as one example of a valve controller is configured so as to control operation of switch circuit 3 and switching circuit 8d independently. Moreover, pump controller 12c as one example of a pump controller is configured so as to control operation of switching circuit 4c in accordance with an operation state of valve controller 11c.

Shape memory alloy wires 5c, 5d in FIG. 11 are used to configure micropumps 50c similar to micropump 50a of the first embodiment, and shape memory alloy wires 9i, 9j are used to configure microvalves 51d similar to microvalve 51a of the first embodiment, by which fluid conveyance device 1c functions as the driving device including micropumps 50c and microvalves 51d.

In the third embodiment, all the driving mechanisms that use the shape memory alloy wires to drive micropumps 50c and microvalves 51d have the same structure and action.

This is desirable in that design is easy, and that characteristics do not change even if the driven microvalve is switched.

Figure 12:
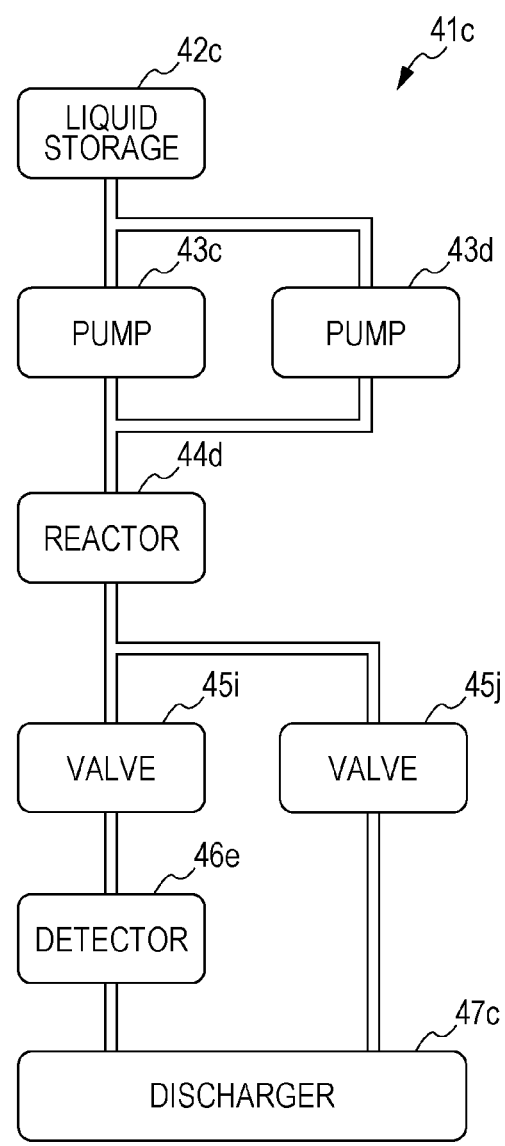
FIG. 12 is a diagram showing an outline of a microfluidic device using the fluid conveyance device in the third embodiment of the present disclosure.

FIG. 12 shows an outline of microfluidic device 41c using fluid conveyance device 1c. As shown in FIG. 12, in microfluidic device 41c, liquid storage 42c, micropumps 43c, 43d, reactor 44d, microvalves 45i, 45j, detectors 46e, and discharger 47c are connected almost in this order. Microvalve 45j is connected to discharger 47c without going through the detector and the like. Micropumps 43c, 43d are each configured by micropump 50c. Microvalves 45i, 45j are each configured by microvalve 51d. Liquid storage 42c, reactor 44d, detector 46e, and discharger 47c are arranged on flow channel substrate 29.

Microfluidic device 41c operates micropump 43c driven by shape memory alloy wire 5c and micropump 43d driven by shape memory alloy wire 5d in a state where microvalve 45j driven by shape memory alloy wire 9j is opened to send a liquid stored in liquid storage 42c provided on flow channel substrate 29 to reactor 44d. Opening microvalve 45i driven by shape memory alloy wire 9i allows the liquid subjected to reaction processing in reactor 44d to be sent to detector 46e by operation of micropump 43c. Accordingly, determination processing is performed in detector 46e. The liquid passing through detector 46e or microvalve 45j is discharged to discharger 47c.

Figure 13:
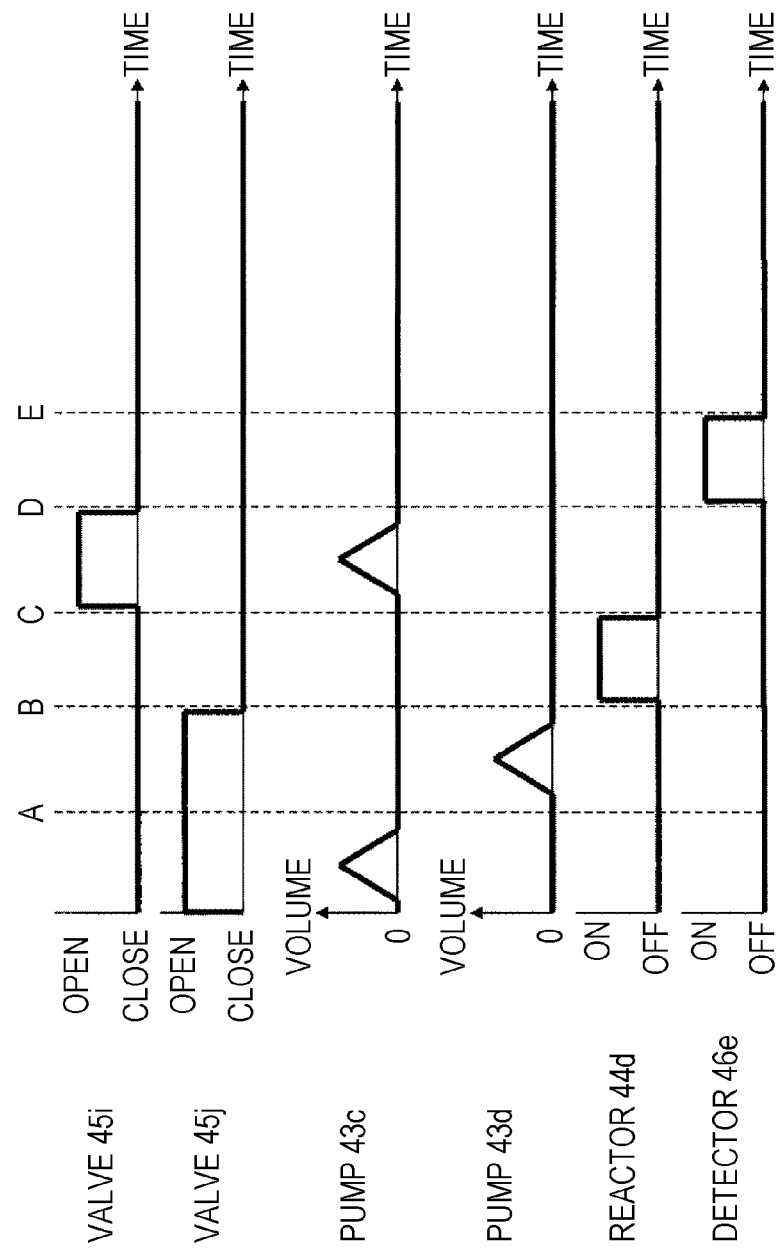
FIG. 13 is a timing chart of operation of the microfluidic device using the fluid conveyance device in the third embodiment of the present disclosure.

FIG. 13 shows a timing chart of operation of microfluidic device 41c.

Microfluidic device 41c first (in a period from liquid sending start to time A in FIG. 13, e.g., for 20 seconds) opens microvalve 45j, and then performs the pump operation which includes suction operation of increasing a volume of micropump 43c (corresponding to the volume of internal space 32 in FIGS. 2 and 3), and discharge operation of reducing the volume of micropump 43c. As a result, the liquid starts to be supplied from liquid storage 42c to reactor 44d through micropump 43c.

Next (between times A and B in FIG. 13, e.g., for 20 seconds), pump operation is performed, which is made of suction operation of increasing a volume of micropump 43d (corresponding to the volume of internal space 32 in FIGS. 2 and 3, but a maximum volume is smaller than that of micropump 43c, e.g., a volume of 1/10), and discharge operation of reducing the volume of micropump 43d. As a result, a precise amount of liquid is sent to reactor 44d from liquid storage 42c through micropump 43d, and after the liquid is supplied to reactor 44d in proper quantities, microvalve 45j is closed.

Next (between times B and C in FIG. 13, e.g., for 5 minutes), the reaction processing is performed in reactor 44d.

Next (between times C and D in FIG. 13, e.g., for 20 seconds), after microvalve 45i is opened, the pump operation of micropump 43c is performed to send the liquid subjected to the reaction processing in reactor 44d to detector 46e, and then, microvalve 45i is closed.

Next (between times D and E in FIG. 13, e.g., for 1 minute), the determination processing is performed in detector 46e.

Next, action of this fluid conveyance device 1c will be described.

In the operation of microfluidic device 41c in FIG. 13, when micropumps 43c, 43d perform the pump operation, either of microvalves 45i and 45j is necessarily opened. That is, a period when shape memory alloy wire 5c that drives micropump 43c or shape memory alloy wire 5d that drives micropump 43d is energized is necessarily included in a period when shape memory alloy wire 9i or 9j to drive microvalve 45i or 45j is energized.

Figure 14:
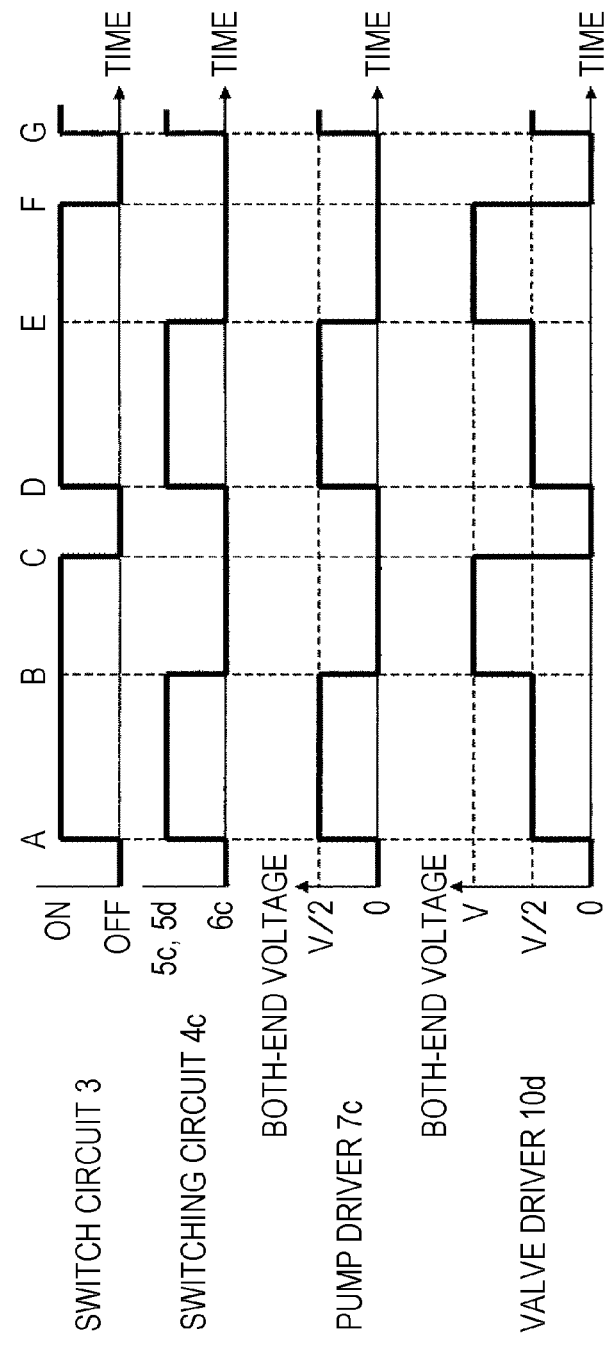
FIG. 14 is a diagram showing a timing chart indicating an energization state during driving micropumps and microvalves in the third embodiment of the present disclosure.

FIG. 14 is a timing chart indicating an energization state during driving the micropumps and the microvalves.

Valve controller 11c operates switching circuit 8d so that the shape memory alloy wire corresponding to the microvalve that is desired to operate of shape memory alloy wires 9i, 9j is energized in accordance with the timing chart in FIG. 13. Thereafter, switch circuit 3 is turned on and off, by which valve driver 10d is intermittently energized, and target microvalve 45i or 45j is opened.

With a period between times A and D and a period between times D and G in FIG. 14 each defined as one cycle (e.g., 1 millisecond), valve controller 11c turns on switch circuit 3 only in a period when only enough average electric power to open the respective microvalves is applied (between times A and C and between times D and F in FIG. 14). At this time, even in a state where a period when switching circuit 4c moves to shape memory alloy wire 5c or shape memory alloy wire 5d becomes maximum, it is desirable to turn on switch circuit 3 on only in the period when only enough average electric power to open the microvalves is applied, because switch circuit 3 can be operated at constant timing regardless of the state of the micropumps.

In this case, if a period when switching circuit 4c moves to shape memory alloy wire 5c or shape memory alloy wire 5d becomes short, the applied average electric power increases, which raises pressing member 23 from the state in FIG. 3. However, this is not a problem as the operation of the valve.

Moreover, as the period when switching circuit 4c is connected to shape memory alloy wire 5c or shape memory alloy wire 5d (between times A and B, and between times D and E in FIG. 14) is shorter, the period when switch circuit 3 is turned on (between times A and C, and between times D and F in FIG. 14) is shortened to apply only the average electric power required for opening the microvalves. It is desirable in that unnecessary power consumption can be suppressed.

Pump controller 12c switches switching circuit 4c between shape memory alloy wire 5c or shape memory alloy wire 5d, and copper wire 6c in synchronization with the timing when valve controller 11c operates switch circuit 3. The period when switching circuit 4c is connected to shape memory alloy wire 5c or shape memory alloy wire 5d (between times A and B, and between times D and E in FIG. 14) is adjusted by pump controller 12c in accordance with the target pump volume.

In the third embodiment, since all the driving mechanisms using the shape memory alloy wires that drive micropumps 50c and microvalves 51d have the same structure and action except for the volume of micropump 43d, the electric powers applied to the shape memory alloy wires required for entering the state in FIG. 3 from the state in FIG. 2 are equal.

Accordingly, maximum time between times A and B and between times D and E in FIG. 14 becomes not longer than time between times A and C, and between times D and F in FIG. 14. Between times A and B and between times D and E in FIG. 14, a voltage applied to both ends of pump driver 7c becomes substantially half of voltage V of DC power supply 2.

A voltage applied to both ends of valve drivers 10d becomes substantially half of voltage V of DC power supply 2 between times A and B and between times D and E in FIG. 14, and becomes voltage V of DC power supply 2 between times B and C and between times E and F in FIG. 14. When intervals between times A and C and times D and F in FIG.

14 are each set so as to bring into the state in FIG. 3 at voltage V/2, pressing member 23 rises from the state in FIG. 3, because the voltage becomes V between times B and C and between times E and F in FIG. 14. However, this does not pose a problem as the operation of the valve. On the other hand, since in the period when the voltage becomes V, the average electric power becomes four times as large as that at voltage V/2, valve controller 11c makes an adjustment so that the intervals between times B and C and between times E and F in FIG. 14 each become 1/4, which makes an average electric power energy constant, and maintains the state in FIG. 3.

As one example, when shape memory alloy wires 5c, 5d, 9i, 9j each have a length of 10 mm and a diameter of 150 µm, and when the voltage of DC power supply 2 is 1 V, a duty ratio to apply the electric power equivalent to continuous energization of 0.21 V to shape memory alloy wire 5c or shape memory alloy wire 5d is about 18%, so that a range of the duty ratio that can be used to control the pump volume can become four times without any loss by the resistance.

<Effects>

According to the configuration of the third embodiment, only during the energization to shape memory alloy wire 9i or 9j for microvalve driving, shape memory alloy wire 5c or shape memory alloy wire 5d for micropump driving is energized. Therefore, in contrast to microvalves 45i, 45j of on/off operation, during the driving of micropump 43c or micropump 43d requiring volume control, shape memory alloy wire 5c or shape memory alloy wire 5d for micropump operation is driven at the voltage of DC power supply 2 divided by resistances of shape memory alloy wires 9i, 9j for microvalve operation. As a result, the control of the pump volume becomes easy. Moreover, since the voltage dividing is realized by the resistances of shape memory alloy wires 9i, 9j corresponding to driven microvalves 45i, 45j, wasteful loss is not caused. Thus, fluid conveyance device 1c that easily realizes the control of the pump volume and reduces loss can be attained.

The characteristics of the third embodiment will be described in detail. In the third embodiment, pump driver 7c has the plurality of micropumps 50c, as shown in FIG. 11. In other words, one micropump 50c includes shape memory alloy wire 5c to perform pump operation with extension and contraction of shape memory alloy wire 5c. Other micropump 50c includes shape memory alloy wire 5d to perform pump operation with extension and contraction of shape memory alloy wire 5d.

Switching circuit 4c selects any one of shape memory alloy wires 5c and 5d, and copper wire 6c. In step (b1) of the third embodiment, switching circuit 4c selects either of shape memory alloy wires 5c, 5d. In FIG. 11, shape memory alloy wire 5c is selected. Switching circuit 8d selects either of shape memory alloy wires 9i, 9j. In FIG. 11, shape memory alloy wire 9i is selected. The voltage supplied from power supply part 2 is applied to shape memory alloy wires 5c, 9i selected in this manner for given time. This allows selected shape memory alloy wires 5c, 9i to be heated. This corresponds to the section between A and B and the section between D and E in FIG. 14.

Next, in step (b2), switching circuit 4c is connected to copper wire 6c. The switching circuit 8d remained connected to shape memory alloy wire 9i. In this manner, copper wire 6c and shape memory alloy wire 9i are electrically connected in series. Voltage V supplied from power supply part 2 is applied to shape memory alloy wire 9i without being applied to shape memory alloy wire 5c. Accordingly, the voltage V is applied to shape memory alloy wire 9i. This corresponds to the section between B and C and the section between E and F in FIG. 14.

Microvalve 51d is first opened, and micropump 50c is subsequently opened while repeating steps (b1) and (b2). In this manner, as in the first embodiment, in the third embodiment as well, the fluid flows in fluid conveyance device 1c without wastefully losing the voltage.

While in the third embodiment, DC power supply 2, switch circuit 3, pump driver 7c, and valve driver 10d are arranged in series in the order in FIG. 11, the present disclosure is not limited thereto, and they may be arranged in series in arbitrary order. Similarly, as to the arrangement in series inside pump driver 7c or inside valve driver 10d as well, the arrangement in series in arbitrary order may be employed.

While in the third embodiment, the two shape memory alloy wires for microvalve driving are arranged in parallel, the present disclosure is not limited thereto. A number of the shape memory alloy wires to be switched may be changed in accordance with a number of the microvalves used in the driven fluid device.

While in the third embodiment, the connection between shape memory alloy wire 5c or shape memory alloy wire 5d and copper wire 6c is switched by switching circuit 4c, the present disclosure is not limited thereto. The connection to copper wire 6c may be turned on and off while maintaining the connection to shape memory alloy wire 5c or shape memory alloy wire 5d.

While in the third embodiment, the operation of micropump 43c or micropump 43d is performed in the same volume change pattern one cycle every time, the present disclosure is not limited thereto. Volume change patterns different in maximum volume or change time may be used, or the pump operation may be performed a plurality of times in accordance with the configuration of the fluid device.

While in the third embodiment, all the driving mechanisms using the shape memory alloy wires that drive micropumps 50c and microvalves 51d have the same structure and action, the present disclosure is not limited thereto. Different driving mechanisms may be used to similarly carry out the driving as long as the configuration is such that maximum time between times A and B and between times D and E in FIG. 14 becomes not longer than the time between times A and C and between times D and F in FIG. 14 under an actual operating environment.

While in the third embodiment, shape memory alloy wire 5c, shape memory alloy wire 5d, and copper wire 6c arranged in parallel are switched by one switching circuit 4c, equivalent operation can be realized to similarly carry out the driving even when a configuration is such that a plurality of pump drivers in each of which the shape memory alloy wire and the copper wire arranged in parallel are switched by the switching circuit are arranged in series.

Fourth Embodiment

Configuration

Figure 15:
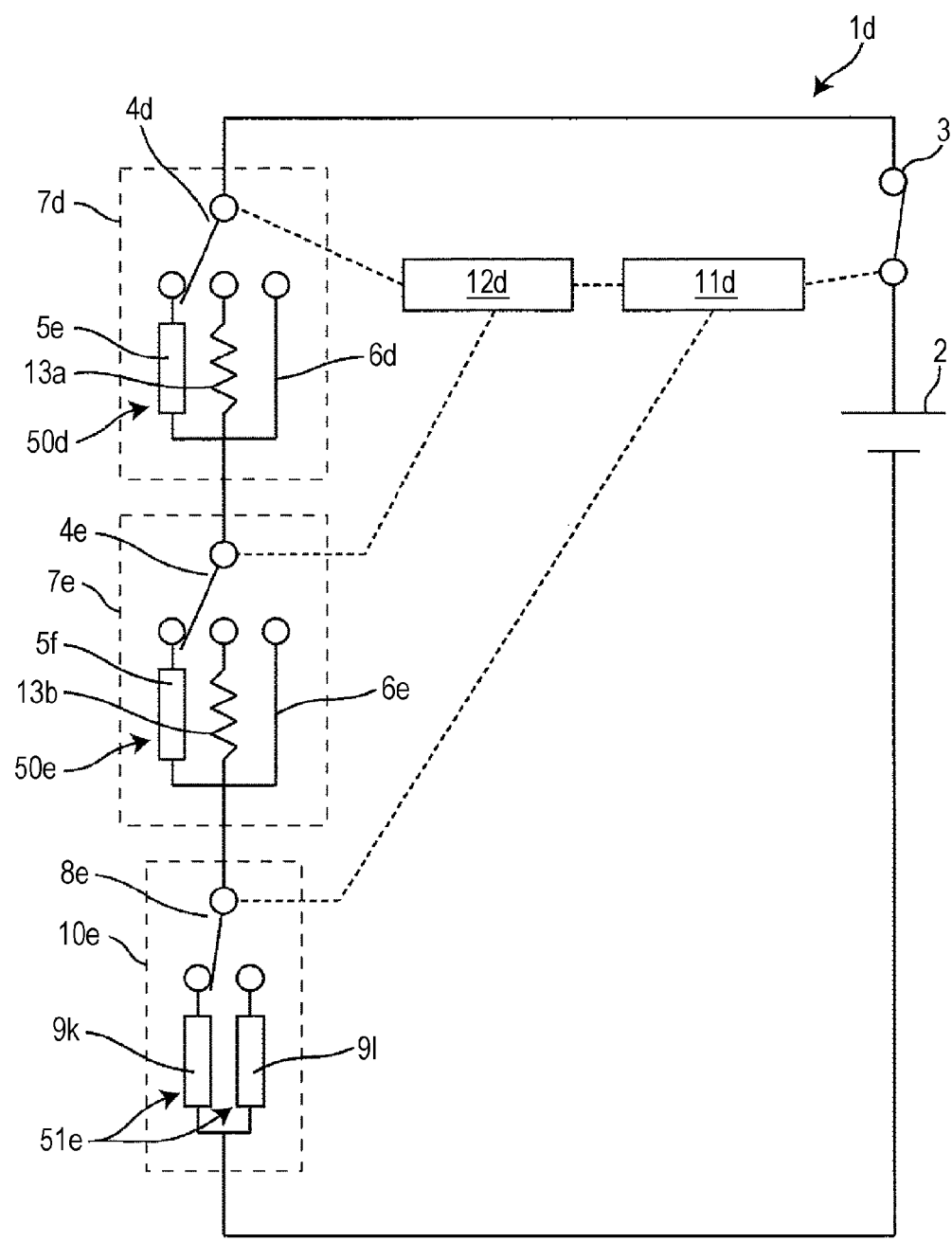
FIG. 15 is a diagram showing an outline of a fluid conveyance device in a fourth embodiment of the present disclosure.

FIG. 15 shows an outline of fluid conveyance device 1d functioning as one example of a driving device of a micropump and a microvalve in a fourth embodiment of the present disclosure.

Fluid conveyance device 1d includes at least pump drivers 7d, 7e, valve driver 10e, a power supply part, a switch part, valve controller 11d, and pump controller 12d. In fluid conveyance device 1d, pump drivers 7d, 7e, valve driver 10d, the power supply part, and the switch part are connected in series.

Fluid conveyance device 1d is driven by DC power supply 2 as one example of the power supply part. Only when switch circuit 3 as one example of the switch part connected to DC power supply 2 is on, a current flows in fluid conveyance device 1d. At this time, the current from DC power supply 2 also flows through pump drivers 7d, 7e and valve driver 10e, which are connected to switch circuit 3 in series.

Pump driver 7d is made up of switching circuit 4d as one example of a first selector switch, linear shape memory alloy wire 5e as one example of a first shape memory alloy wire, resistor 13a as one example of a resistance wiring part, and copper wire 6d as one example of a short-circuit wiring part. A current from DC power supply 2 is configured to flow through any one of shape memory alloy wire 5e, resistor 13a, and copper wire 6d selected by switching circuit 4d.

Pump driver 7e is made up of switching circuit 4e as one example of the first selector switch, linear shape memory alloy wire 5f as one example of the first shape memory alloy wire, resistor 13b as one example of the resistance wiring part, and copper wire 6e as one example of the short-circuit wiring part. The current from DC power supply 2 is configured to flow through any one of shape memory alloy wire 5f, resistor 13b, and copper wire 6e selected by switching circuit 4e.

Respective resistance values of resistors 13a, 13b are substantially the same as resistance values of shape memory alloy wires 5e, 5f. It is desirable in view of smaller resistance to use the copper wires as the examples of the short-circuit wiring parts. However, the present disclosure is not limited thereto, and a short circuit of the short-circuit wiring part may be realized by another conductive material.

Valve driver 10e is made up of switching circuit 8e as one example of a second selector switch, and linear shape memory alloy wires 9k, 9l as examples of second shape memory alloy wires. The current from DC power supply 2 is configured to flow through either of shape memory alloy wires 9k, 9l selected by switching circuit 8e.

Shape memory alloy wire 5e in FIG. 15 is used to configure micropump 50d, shape memory alloy wire 5f is used to configure micropump 50e, shape memory alloy wires 9k, 9l are used to configure microvalves 51e, by which fluid conveyance device 1d functions as one example of a driving device including micropumps 50d, 50e and microvalves 51e.

Valve controller 11d as one example of a valve controller is configured so as to control operation of switch circuit 3 and switching circuit 8e independently. Moreover, pump controller 12d as one example of a pump controller is configured so as to control operation of switching circuit 4d in accordance with an operation state of valve controller 11d.

Shape memory alloy wires 5e, 5f in FIG. 15 are used to configure micropumps 50d, 50e similar to micropump 50a of the first embodiment, and shape memory alloy wires 9k, 9l are used to configure microvalves 51e similar to microvalve 51a of the first embodiment, by which fluid conveyance device 1d functions as one example of the driving device including micropumps 50d, 50e and microvalves 51e.

In the fourth embodiment, all the driving mechanisms that use the shape memory alloy wires to drive micropumps 50d, 50e and microvalves 51e have the same structure and action. This is desirable in that design is easy and that characteristics do not change even if the driven microvalve is switched.

Figure 16:
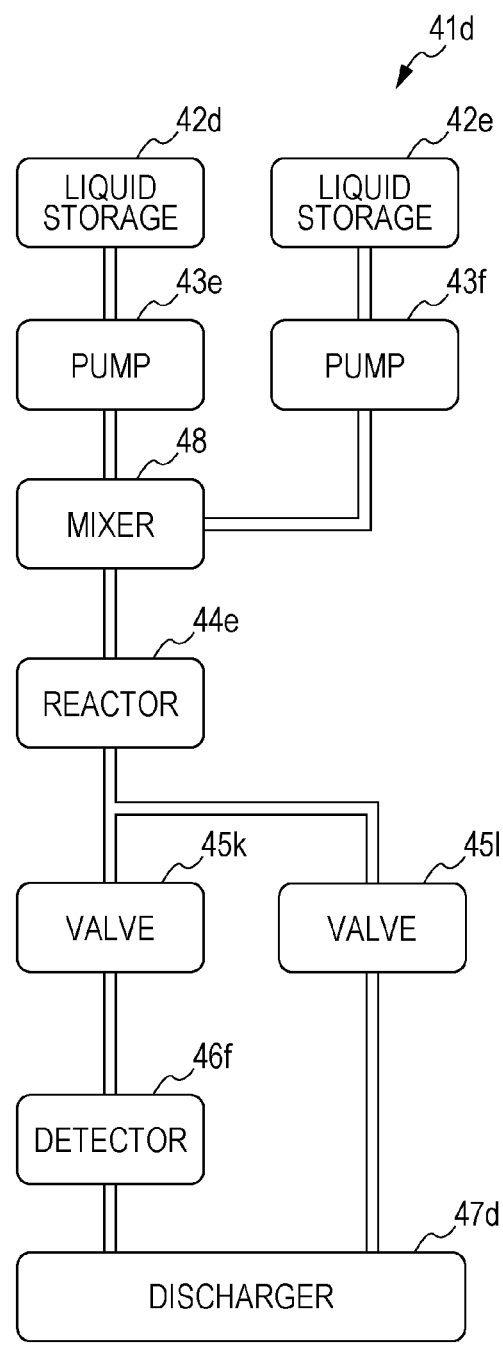
FIG. 16 is a diagram showing an outline of a microfluidic device using the fluid conveyance device in the fourth embodiment of the present disclosure.

FIG. 16 shows an outline of microfluidic device 41d using fluid conveyance device 1d. As shown in FIG. 16, in microfluidic device 41d, liquid storages 42d, 42e, micropumps 43e, 43f, mixer 48, reactor 44e, microvalves 45k, 45l, detectors 46f, and discharger 47d are connected almost in this order. Microvalve 45l is connected to discharger 47d without going through the detector and the like. Micropumps 43e, 43f are configured by micropumps 50d, 50e, respectively. Microvalves 45k, 45l are each configured by microvalve 51e. Liquid storages 42d, 42e, mixer 48, reactor 44e, detector 46f, and discharger 47d are arranged on flow channel substrate 29.

Microfluidic device 41d operates micropump 43e driven by shape memory alloy wire 5e in a state where microvalve 45l driven by shape memory alloy wire 9l is opened to send a liquid stored in liquid storage 42d provided on flow channel substrate 29 to reactor 44e through mixer 48. Moreover, microfluidic device 41d operates micropump 43f driven by shape memory alloy wire 5f in the state where microvalve 45l is opened to send a liquid stored in liquid storage 42e provided on flow channel substrate 29 to reactor 44e through mixer 48. In mixer 48, the liquid sent by micropump 43e and the liquid sent by micropump 43f are joined and mixed by diffusion. Opening microvalve 45k driven by shape memory alloy wire 9k allows the liquid subjected to reaction processing in reactor 44e to be sent to detector 46f by the operation of micropump 43e. Accordingly, determination processing is performed in detector 46f. The liquid passing through detector 46f or microvalve 45l is discharged to discharger 47d.

Figure 17:
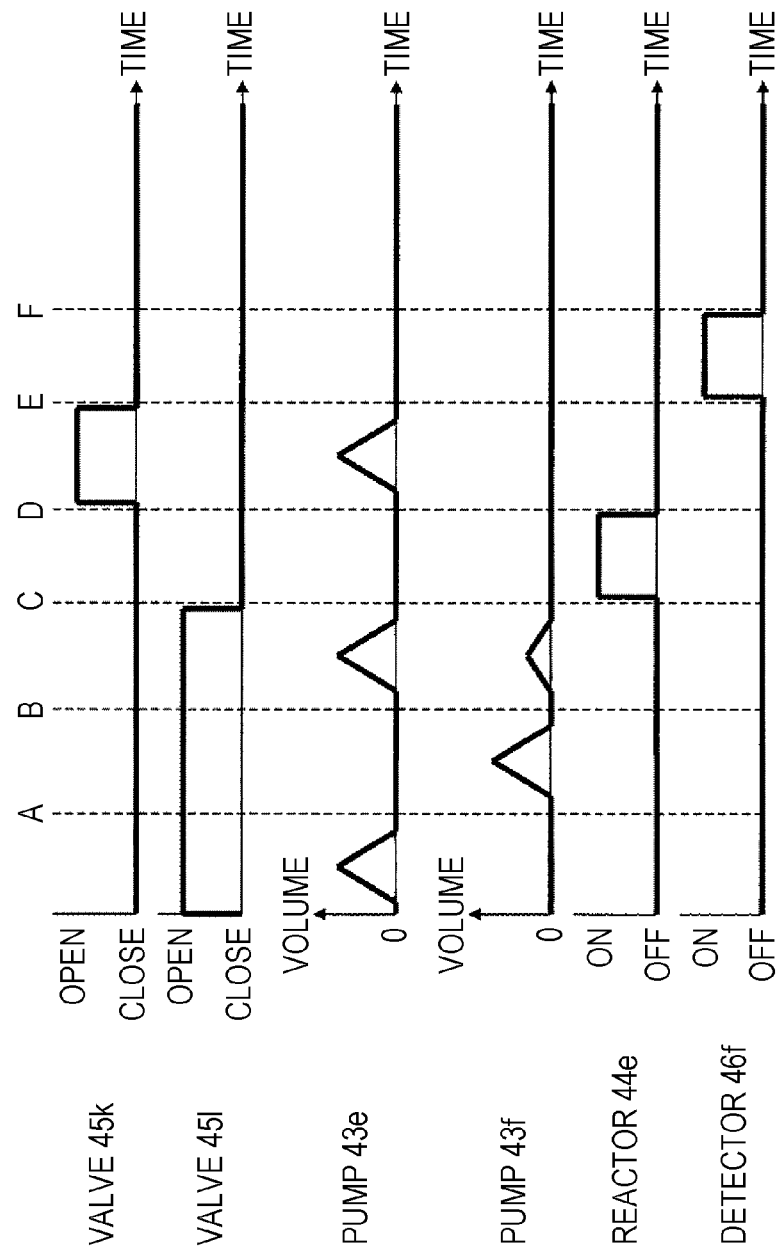
FIG. 17 is a timing chart of operation of the microfluidic device using the fluid conveyance device in the fourth embodiment of the present disclosure.

FIG. 17 shows a timing chart of operation of microfluidic device 41d.

Microfluidic device 41d first (in a period from liquid sending start to time A in FIG. 17, e.g., for 20 seconds) opens microvalve 45l, and then performs pump operation which includes suction operation of increasing a volume of micropump 43e (corresponding to the volume of internal space 32 in FIGS. 2 and 3), and discharge operation of reducing the volume of micropump 43e. As a result, the liquid starts to be supplied to reactor 44e from liquid storage 42d through micropump 43e and mixer 48.

Next (between times A and B in FIG. 17, e.g., for 20 seconds), pump operation is performed, which is made of suction operation of increasing a volume of micropump 43f (corresponding to the volume of internal space 32 in FIGS. 2 and 3), and discharge operation of reducing the volume of micropump 43f, and the liquid is supplied from liquid storage 42e to reactor 44e through micropump 43f and mixer 48.

Next (between times B and C in FIG. 17, e.g., for 20 seconds), the pump operation of micropump 43e and the pump operation of micropump 43f are simultaneously performed to supply the mixed liquid of the liquid of liquid storage 42d and the liquid of liquid storage 42e to reactor 44e through mixer 48, and then, microvalve 45l is closed. At this time, volume change in the pump operation of micropump 43f is made smaller than volume change in the pump operation of micropump 43e (e.g., made smaller up to 1/3). This allows the liquid of liquid storage 42d and the liquid of liquid storage 42e to be mixed at a different ratio (e.g., 3:1). It is desirable that the individual pump operations are performed before simultaneously performing the pump operation of micropump 43e and the pump operation of micropump 43f, because flow channels up to reactor 44e through mixer 48 are filled with the liquids, which makes the ratio of the supplied mixed liquid stable.

Next (between times C and D in FIG. 17, e.g., for 5 minutes), the reaction processing is performed in reactor 44e.

Next (between times D and E in FIG. 17, e.g., for 20 seconds), after microvalve 45k is opened, the pump operation of micropump 43e is performed to send the liquid subjected to the reaction processing in reactor 44e to detector 46f, and then microvalve 45k is closed.

Next (between times E and F in FIG. 17, e.g., for 1 minute), the determination processing is performed in detector 46f.

Next, action of this fluid conveyance device 1d will be described.

In the operation of microfluidic device 41d in FIG. 17, when micropumps 43e, 43f perform the pump operation, either of microvalves 45k and 45l is necessarily opened. That is, a period when shape memory alloy wire 5e that drives micropump 43e or shape memory alloy wire 5f that drives micropump 43f is energized is necessarily included in a period when shape memory alloy wire 9k or 9l to drive microvalve 45k or 45l is energized.

Figure 18:
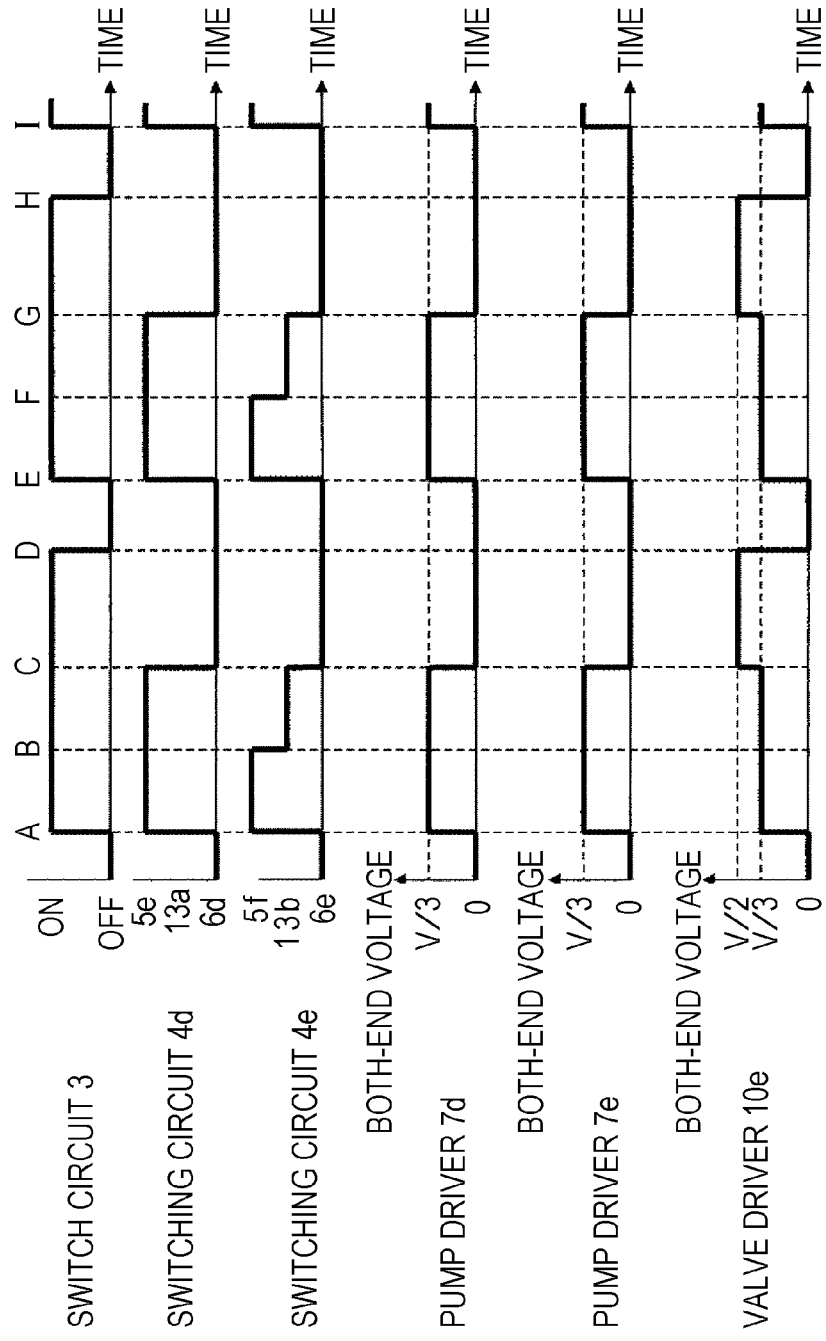
FIG. 18 is a diagram showing a timing chart indicating an energization state during driving micropumps and microvalves in the fourth embodiment of the present disclosure.

FIG. 18 is a timing chart indicating an energization state during driving the micropumps and the microvalves. This is a timing chart between times B and C in FIG. 17 when two micropumps 43e, 43f simultaneously operate.

Up to time A in FIG. 17, by connecting switching circuit 4e to copper wire 6e, the timing chart is similar to the timing chart in FIG. 14 in which the only one micropump is used. Moreover, between times A and B in FIG. 17, by connecting switching circuit 4d to copper wire 6d, the timing chart is similar to the timing chart in FIG. 14 in which the only one micropump is used. In both the cases, resistors 13a and 13b are not used.

In accordance with the timing chart in FIG. 17, valve controller 11d operates switching circuit 8e so that the shape memory alloy wire corresponding to the microvalve that is desired to operate of shape memory alloy wires 9k, 9l is energized. Thereafter, switch circuit 3 is turned on and off, by which valve driver 10e is intermittently energized, and target microvalve 45k or 45l is opened.

With a period between times A and E and a period between times E and I in FIG. 18 each defined as one cycle (e.g., 1 millisecond), valve controller 11d turns on switch circuit 3 only in a period when only enough average electric power to open the respective microvalves is applied (between times A and D and between times E and H in FIG. 18). At this time, even in a state where a period when switching circuit 4d moves to shape memory alloy wire 5e or a period when switching circuit 4e moves to shape memory alloy wire 5f becomes maximum, it is desirable to turn on switch circuit 3 only in the period when only enough average electric power to open the microvalves is applied, because switch circuit 3 can be operated at constant timing regardless of the state of the micropumps.

In this case, if a period when switching circuit 4d moves to copper wire 6d or a period when switching circuit 4e moves to copper wire 6e becomes long, the applied average electric power increases, which raises pressing member 23 from the state in FIG. 3. However, this is not a problem as the operation of the valve.

Moreover, as the period when switching circuit 4d is connected to copper wire 6d or the period when switching circuit 4e movers to copper wire 6e (between times C and D, and between times G and H in FIG. 18) is longer, the period when switch circuit 3 is turned on (between times A and D, and between times E and H in FIG. 18) is shortened to apply only the average electric power required for opening the microvalves. It is desirable in that unnecessary power consumption can be suppressed. Pump controller 12d switches switching circuit 4e among shape memory alloy wire 5e, resistor 13a, and copper wire 6d, and switches switching circuit 4f among shape memory alloy wire 5f, resistor 13b and copper wire 6e in synchronization with the timing when valve controller 11d operates switch circuit 3.

A period when switching circuit 4d is connected to shape memory alloy wire 5e (between times A and C and between times E and G in FIG. 18) or a period when switching circuit 4e is connected to shape memory alloy wire 5f (between times A and B and between times E and F in FIG. 18) is adjusted by pump controller 12d in accordance with the target pump volume.

In the fourth embodiment, since the volume change of micropump 43e is larger than the volume change of micropump 43f, in the period when switching circuit 4d is connected to shape memory alloy wire 5e is longer than the period when switching circuit 4e is connected to shape memory alloy wire 5f. Between times B and C and between times F and G in FIG. 18, since shape memory alloy actuator 5f is not energized and only shape memory alloy wire 5e is energized, connecting switching circuit 4e to resistor 13b prevents fluctuations of the voltage applied to shape memory alloy wire 5e.

While resistor 13a is used when operation in which the volume change of micropump 43f becomes larger than the volume change of micropump 43e is simultaneously performed, the operation in the timing chart in FIG. 17 does not have the state. Thus, the resistor 13a may be omitted.

In the fourth embodiment, since all the driving mechanisms using the shape memory alloy wires that drive micropumps 50d, 50e and microvalves 51e have the same structure and action, the electric powers applied to the shape memory alloy wires required for entering the state in FIG. 3 are equal.

Accordingly, maximum time between times A and C and between times E and G in FIG. 18 becomes not longer than time between times A and D, and between times E and H in FIG. 18. Between times A and B and between times E and G in FIG. 18, a voltage applied to both ends of pump drivers 7d, 7e becomes substantially 1/3 of voltage V of DC power supply 2. A voltage applied to both ends of valve driver 10e becomes substantially 1/3 of voltage V of DC power supply 2 between times A and C and between times E and G in FIG. 18, and becomes substantially half of voltage V of DC power supply 2 between times C and D and between G and H in FIG. 18.

When intervals between times A and D and between E and H in FIG. 18 are each set so as to bring into the state in FIG. 3 at voltage V/3, pressing member 23 rises from the state in FIG. 3 because the voltage becomes V/2 between times C and D and between times G and H in FIG. 18. However, this does not pose a problem as the operation of the valves. On the other hand, since in the period when the voltage becomes V/2, the average electric power becomes 2.25 times as large as that at voltage V/3, valve controller 11d makes an adjustment so that the intervals between times C and D and between times G and H in FIG. 18 each become 1/2.25, which makes an average electric power energy constant, and maintains the state in FIG. 3.

As one example, when shape memory alloy wires 5e, 5f, 9k, 9l each have a length of 10 mm and a diameter of 150 µm, and when the voltage of DC power supply 2 is 1 V, a duty ratio to apply the electric power equivalent to continuous energization of 0.21 V to shape memory alloy wire 5e or shape memory alloy wire 5f is about 18% in the period up to time A in FIG. 17 and between time A and B in FIG. 17, so that a range of the duty ratio that can be used to control the pump volume can become four times without any loss by the resistance. Moreover, between times B and C in FIG. 17, the duty ratio becomes about 40%, so that the range of the duty ratio that can be used to control the pump volume can become nine times with only resistance loss for limited time between times B and C and between times F and G in FIG. 18.

<Effects>

According to the configuration of the fourth embodiment, only during the energization to shape memory alloy wire 9k or 9l for microvalve driving, shape memory alloy wire 5e or shape memory alloy wire 5f for micropump driving is energized. Therefore, in contrast to microvalves 45k, 45l of on/off operation, during the driving of micropump 43e or micropump 43f requiring volume control, shape memory alloy wire 5e or shape memory alloy wire 5f for micropump operation is driven at the voltage of DC power supply 2 divided by resistances of shape memory alloy wires 9k, 9l for microvalve operation. As a result, the control of the pump volume becomes easy. Moreover, since the voltage dividing is realized by resistances of shape memory alloy wires 9k, 9l corresponding to driven microvalve 45k, 45l, wasteful loss is only partially caused. Thus, fluid conveyance device 1d that easily realizes the control of the pump volume and reduces loss can be attained.

The characteristics of the fourth embodiment will be described in more detail. In the fourth embodiment, fluid conveyance device 1d further includes pump driver 7e, as shown in FIG. 15. Pump driver 7e is connected to pump driver 7d in series. Similar to pump driver 7d, pump driver 7e has shape memory alloy wire 5f, micropump 50e that performs the pump operation with extension and contraction of third shape memory alloy wire 5f, second wiring part 6e arranged in parallel to third shape memory alloy wire 5f, and third switching circuit 4e that switches between a state where only shape memory alloy wire 5f is energized and a state where copper wire 6e is energized.

Pump driver 7d and valve driver 10e are the same as pump driver 7a and valve driver 10a in the first embodiment, respectively. Accordingly, operation of pump driver 7d and valve driver 10e is also the same as the operation of pump driver 7a and valve driver 10a in the first embodiment. Thus, operation of pump driver 7e will be described.

In step (b1), shape memory alloy wire 5f is selected through switching circuit 4e to apply the voltage supplied from power supply part 2 to shape memory alloy wire 5f for given time. In this manner, shape memory alloy wire 5f is heated. This corresponds to the section between A and B and the section between E and F in FIG. 14.

Pump drivers 7d, 7e may further include resistor 13a and resistor 13b, respectively. Resistor 13a is electrically in parallel to shape memory alloy wire 5e and short-circuit wiring part 6d. Resistors 13a, 13b may be selected through switching circuits 4d, 4f. When resistor 13b is selected, shape memory alloy wire 5f is not heated. This corresponds to the section between B and C and the section between F and G in FIG. 18.

In step (b2), wiring part 6e is selected through switching circuit 4e. This corresponds to the section between C and D and the section between G and H.

Microvalve 51e is first opened, and micropumps 50d, 50e are subsequently opened while repeating steps (b1) and (b2). As in the first embodiment, in the fourth embodiment as well, in this manner, the fluid flows in fluid conveyance device 1d without wastefully losing the voltage.

While in the fourth embodiment, DC power supply 2, switch circuit 3, pump drivers 7d, 7e, and valve driver 10e are arranged in series in the order in FIG. 15, the present disclosure is not limited thereto, and they may be arranged in series in arbitrary order. Similarly, as to the arrangement in series inside pump drivers 7d, 7e or inside valve driver 10e as well, the arrangement in series in arbitrary order may be employed.

While in the fourth embodiment, the two shape memory alloy wires for microvalve driving are arranged in parallel, the present disclosure is not limited thereto. A number of the shape memory alloy wires to be switched may be changed in accordance with a number of the microvalves used in the driven fluid device.

While in the fourth embodiment, the connection between shape memory alloy wire 5e or resistor 13a, and copper wire 6d is switched by switching circuit 4d, the present disclosure is not limited thereto. The connection to copper wire 6d may be turned on and off while maintaining the connection to shape memory alloy wire 5e or resistor 13a.

While in the fourth embodiment, the connection between shape memory alloy wire 5f or resistor 13b, and copper wire 6e is switched by switching circuit 4e, the present disclosure is not limited thereto. The connection to copper wire 6e may be turned on and off while maintaining the connection to shape memory alloy wire 5f or resistor 13b.

While in the fourth embodiment, the operation of micropump 43e or micropump 43f is performed in the same volume change pattern one cycle every time, the present disclosure is not limited thereto. Volume change patterns different in maximum volume or change time may be used, or the pump operation may be performed a plurality of times in accordance with the configuration of the fluid device.

While in the fourth embodiment, all the driving mechanisms using the shape memory alloy wires that drive micropumps 50d, 50e and microvalves 51e have the same structure and action, the present disclosure is not limited thereto. Different driving mechanisms may be used to similarly carry out the driving as long as the configuration is such that maximum time between times A and C and between times E and G in FIG. 18 becomes not longer than the time between times A and D and between times E and H in FIG. 18 under an actual operating environment.

Figure 19:
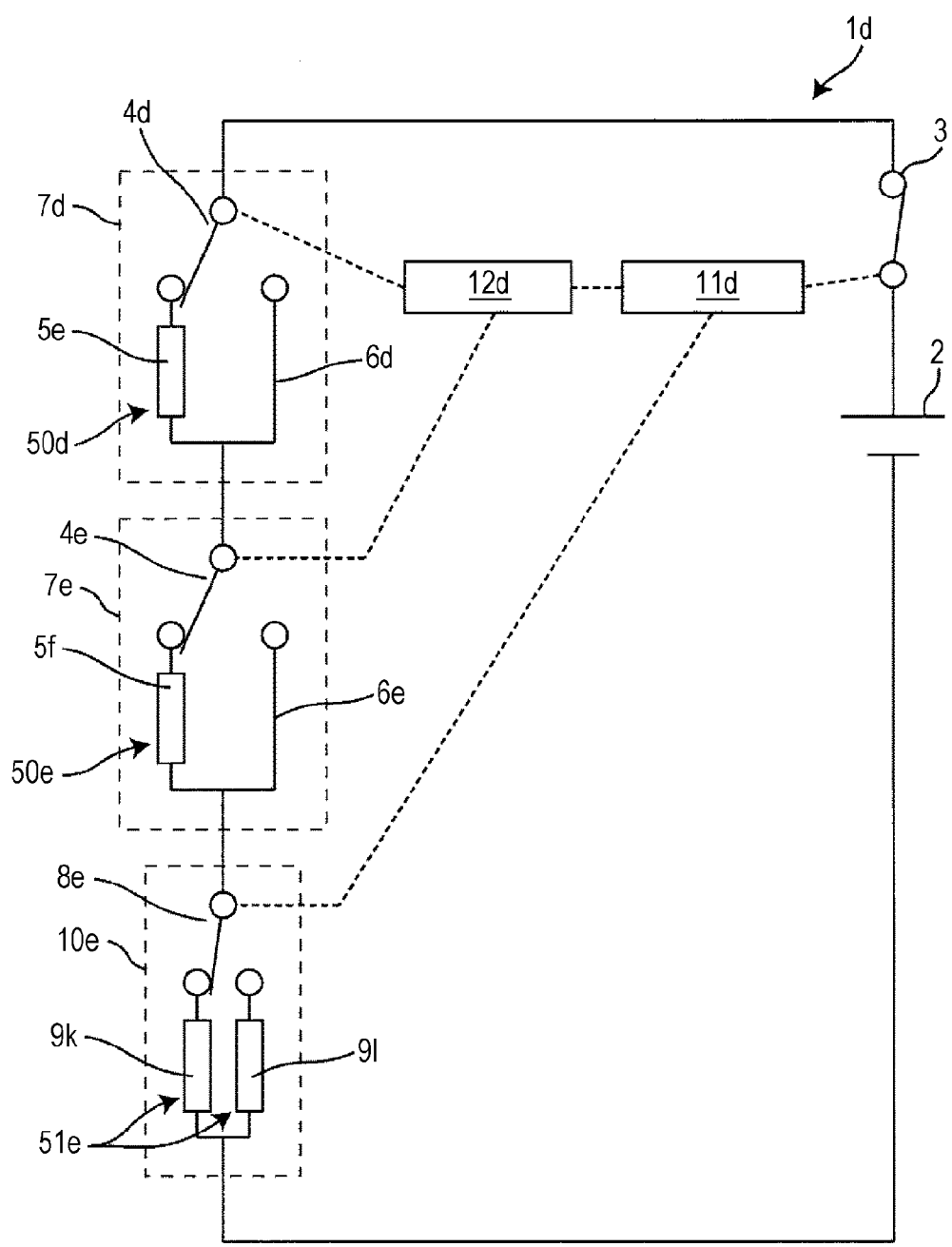
FIG. 19 is a diagram showing an outline of a fluid conveyance device in a modification of the fourth embodiment of the present disclosure.

The present disclosure is not limited to the above-described embodiments, but can be carried out in various aspects. For example, as a modification of the fourth embodiment, as shown in FIG. 19, resistors 13a, 13b may be removed from respective micropumps 50d, 50e in FIG. 15, a plurality of pump drivers 7d, 7e may be included, and respective pump drivers 7d, 7e may be connected in series.

According to the above-described configuration, a driving device of a micropump and a microvalve that easily realizes control of the pump volume and reduces loss can be attained in a state where the plurality of micropumps 50d, 50e are constantly driven simultaneously.

Combining the arbitrary embodiments and modifications of the above-described embodiments and modifications, as needed, can exert effects by the respective embodiments and modifications.

The driving device of the micropump and the microvalve, and the microfluidic device using the driving device according to the present disclosure can easily realize the control of the pump displacement and reduce loss, which is useful. Thus, the microfluidic device using the driving device of the micropump and microvalve according to the present disclosure can be used, for example, as a microfluidic device in which a supplied liquid such as blood is sent to a reactor provided on the device to be subjected to thermal or chemical reaction processing, and the liquid after the reaction processing is then sent to a detector provided on the device to determine a result of the reaction, by which the supplied liquid is evaluated. Moreover, in addition to the sending of the liquid in the microfluidic device, the driving device of the micropump and the microvalve, and the microfluidic device using the driving device according to the present disclosure can be applied as a driving device of a compounding device that compounds small amounts of liquids having characteristics such as taste and fragrance, and a microfluidic device using the same.

REFERENCE SINGS LIST 1a, 1b, 1c, 1d FLUID CONVEYANCE DEVICE
2 DC POWER SUPPLY
3 SWITCH CIRCUIT
4a, 4b, 4c, 4d SWITCHING CIRCUIT
5a, 5b, 5c, 5d, 5e, 5f SHAPE MEMORY ALLOY WIRE
6a, 6b, 6c, 6d, 6e COPPER WIRE
7a, 7b, 7c, 7d, 7e PUMP DRIVER
8a, 8b, 8c, 8d, 8e SWITCHING CIRCUIT
9a, 9b, 9c, 9d, 9e, 9f, 9g, 9h, 9i, 9j, 9k, 9l SHAPE MEMORY ALLOY WIRE
10a, 10b, 10c, 10d, 10e VALVE DRIVER
11a, 11b, 11c, 11d VALVE CONTROLLER
12a, 12b, 12c, 12d PUMP CONTROLLER
13a, 13b RESISTOR
21 SHAPE MEMORY ALLOY WIRE
22 HOLDING MEMBER
23 PRESSING MEMBER
23a END PORTION
24 WIRING
25 WIRING
26 COMPRESSION SPRING
27 FIXED PLATE
28 PRESSURE PLATE
29 FLOW CHANNEL SUBSTRATE
29a DEPRESSION
30 RESIN FILM
31 HOLE
32 INTERNAL SPACE
33a, 33b FLOW CHANNEL
41a, 41b, 41c, 41d MICROFLUIDIC DEVICE
42a, 42b, 42c, 42d, 42e LIQUID STORAGE
43a, 43b, 43c, 43d, 43e, 43f, 50a, 50b, 50c, 50d, 50e MICROPUMP
44a, 44b, 44c, 44d, 44e REACTOR
45a, 45b, 45c, 45d, 45e, 45f, 45g, 45h, 45i, 45j, 45k, 45l, 51a, 51b, 51c, 51d, 51e MICROVALVE
46a, 46b, 46c, 46d, 46e, 46f DETECTOR
47a, 47b, 47c, 47d DISCHARGER
48 MIXER
52 CHECK VALVE

What is claimed is:

1. A driving device comprising:
a pump driver circuit including: a first shape memory alloy wire, a wiring part arranged in electrically parallel to the first shape memory alloy wire, and a first selector switch that switches between a state where electric power is supplied only to the first shape memory alloy wire and a state where the electric power is supplied to the wiring part, a micropump that performs pump operation with extension and contraction of the first shape memory alloy wire being formed;
a valve driver circuit including: a plurality of second shape memory alloy wires, and a second selector switch that brings into a state where the electric power is supplied to one of the plurality of second shape memory alloy wires, a plurality of microvalves that perform valve operation with extension and contraction of the respective plurality of second shape memory alloy wires being formed;
a power supply for supplying the electric power;
a switch that is connected to the pump driver circuit and the valve driver circuit in series, and turns on and off a current flowing through the pump driver circuit and the valve driver circuit from the power supply;
a valve controller that controls a state of the second selector switch and frequency of on and off of the switch part; and
a pump controller that controls a period when the first selector switch enters the state where electric power is supplied only to the first shape memory alloy wire, when the switch part is in an on state.

2. The driving device according to claim 1, wherein:
the driving device comprises a plurality of valve driver circuits, each of the plurality of valve driver circuits being the valve driver circuit, and
the plurality of valve driver circuits are connected in series.

3. The driving device according to claim 1, wherein:
the pump driver circuit has a plurality of first shape memory alloy wires, each of the plurality of first shape memory alloy wires being the first shape memory alloy wire, and constitute corresponding one of a plurality of micropumps, and
the first selector switch switches to a state where the electric power is supplied to one of the plurality of first shape memory alloy wires or to the wiring part.

4. The driving device according to claim 1, wherein:
the drive device includes a plurality of pump driver circuits, each of the plurality of pump driver circuits being the pump driver circuit, and
the plurality of pump driver circuits are connected in series.

5. The driving device according to claim 4, wherein:
each of the plurality of pump driver circuits has a resistor in parallel to the first shape memory alloy wire, and
each of the first selector switches switches to a state where the electric power is supplied only to the resistor.

6. The driving device according to claim 1,
wherein the valve controller adjusts frequency of on and off of the switch part in accordance with a period when the pump controller brings into the state where the electric power is supplied only to the first shape memory alloy wire.

7. A microfluidic device comprising:
a micropump;
a plurality of microvalves;
a driving device of the micropump and the plurality of micovalves;
a liquid storage; and
a discharger connected to at least one of the plurality of microvalves, wherein:
the micropump is fluid communicably connected to the liquid storage,
the plurality of microvalves are fluid communicably connected to the micropump,
the driving device comprises:
a pump driver circuit including: a first shape memory alloy wire, a wiring part arranged in electrically parallel to the first shape memory alloy wire, and a first selector switch that switches between a state where electric power is supplied only to the first shape memory alloy wire is energizable and a state where the electric power is supplied to the wiring part;

a valve driver circuit including: a plurality of second shape memory alloy wires, and a second selector switch that brings into a state where the electric power is supplied to one of the plurality of second shape memory alloy wires;

a power supply for supplying the electric power;

a switch that is connected to the pump driver circuit and the valve driver circuit in series, and turns on and off a current flowing through the pump driver circuit and the valve driver circuit from the power supply;

a valve controller that controls a state of the second selector switch and frequency of on and off of the switch; and a pump controller that controls a period when the first selector switch enters the state where the electric power is supplied only to the first shape memory alloy wire, when the switch part is in an on state, the micropump performs pump operation with extension and contraction of the first shape memory alloy wire, and the plurality of microvalves perform valve operation with extension and contraction of the respective plurality of second shape memory alloy wires.

8. The driving device according to claim 1, which is further operative to:
(a) heat the first shape memory alloy wire and one of the plurality of second shape memory alloy wires to which the electric power is supplied by a selection operation of the second selector switch, as a selected second shape memory alloy wire, to open the micropump including the first shape memory alloy wire and corresponding one of the plurality of microvalves including the selected second shape memory alloy wires by repeating the following (b) and (c):
(b) applying a voltage from the power supply to the first shape memory alloy wire and the selected second shape memory alloy wire selected by the first selector switch and the second selector switch for given time, respectively, to heat the first shape memory alloy wire and the selected second shape memory alloy wire; and
(c) applying the voltage from the power supply to the wiring part and the selected second shape memory alloy wire selected by the first selector switch and the second selector switch, respectively, to heat the selected second shape memory alloy wire.

9. The driving device according to claim 1, wherein the micropump further includes a spring through which the first shape memory alloy wire passes.

10. The microfluidic device according to claim 7, wherein the micropump further includes a spring through which the first shape memory alloy wire passes.

11. The driving device according to claim 1, wherein the second selector switch included in the valve driver circuit is electrically connected to the first shape memory alloy wire and the wiring part, both of which are included in the pump driver circuit.

12. The microfluidic device according to claim 7, wherein the second selector switch included in the valve driver circuit is electrically connected to the first shape memory alloy wire and the wiring part, both of which are included in the pump driver circuit.

* * * * *